United States Patent [19]

Fukuchi et al.

[11] Patent Number: 4,691,045

[45] Date of Patent: Sep. 1, 1987

[54] HYDROXYL GROUP-CONTAINING (METH)ACRYLATE OLIGOMER, PREPOLYMER THEREFROM, AND METHOD FOR USE THEREOF

[75] Inventors: Shuzo Fukuchi; Shigeru Yamaguchi, both of Himeji, Japan

[73] Assignee: Nippon Shokubai Kagaku Co., Ltd., Japan

[21] Appl. No.: 805,342

[22] Filed: Dec. 5, 1985

[30] Foreign Application Priority Data

Dec. 6, 1984 [JP] Japan .................. 59-256558
Feb. 26, 1985 [JP] Japan .................. 60-35350
Jul. 8, 1985 [JP] Japan .................. 60-148374
Oct. 2, 1985 [JP] Japan .................. 60-218037
Oct. 29, 1985 [JP] Japan .................. 60-240661

[51] Int. Cl.$^4$ .................................................. C08F 20/26
[52] U.S. Cl. ........................................ 560/185; 522/95; 522/96; 522/154; 526/301; 526/320; 526/318
[58] Field of Search ............... 522/95, 96, 154; 526/320; 560/185

[56] References Cited

U.S. PATENT DOCUMENTS

| | | | |
|---|---|---|---|
| 3,594,410 | 7/1971 | Cohen ............................ | 526/320 |
| 3,663,599 | 5/1972 | Koshimura ..................... | 526/320 |
| 3,850,770 | 11/1974 | Juna et al. ..................... | 522/95 |
| 4,228,232 | 10/1980 | Rousseau ....................... | 522/95 |
| 4,281,172 | 7/1981 | Knopf ............................. | 560/185 |
| 4,458,007 | 7/1984 | Geissler et al. ............... | 522/95 |

*Primary Examiner*—Paul R. Michl
*Attorney, Agent, or Firm*—Omri M. Behr

[57] ABSTRACT

A hydroxyl group-containing (meth)acrylate oligomer represented by the general formula I:

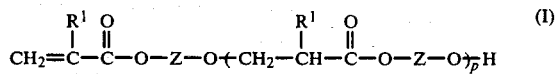

(I)

wherein two $R^1$'s independently stand for hydrogen atom or methyl group, two Z's independently stand for a divalent organic group of 2 to 20 carbon atoms, and p stands for an integer of the value of 1 to 100, and urethane, carboxyl and hydroxyl modified prepolymer thereof.

22 Claims, 17 Drawing Figures

HYDROXYL GROUP-CONTAINING (METH)ACRYLATE OLIGOMER, PREPOLYMER THEREFROM, AND METHOD FOR USE THEREOF

BACKGROUND OF THE INVENTION

1. Field of the Invention

This invention relates to a novel hydroxyl group-containing (meth)acrylate oligomer, a method for the production thereof, a prepolymer from the oligomer mentioned above, a method for the production thereof, and a method for the use of the oligomer and the prepolymer. More particularly, this invention relates to a novel hydroxyl group-containing (meth)acrylate oligomer to be used for the production of polymers, copolymers, etc. useful in various applications, a method for the production of a hydroxyl group-containing (meth)acrylate oligomer from a hydroxyl group-containing (meth)acrylate as a raw material, a prepolymer from the oligomer, a method for the production of a prepolymer from the oligomer as a raw material, and a method for the use of the oligomer and prepolymer.

2. Description of Prior Art

The compound which contains a hydroxyl group and an acryloyloxy group or methacryloyloxy group in the molecular unit thereof is called a hydroxyl group-containing acrylate or methacrylate (hereinafter referred to collectively as a "hydroxyl group-containing (meth)acrylate" for short). Since the hydroxyl group-containing (meth)acrylate contains the two reactive functional groups, hydroxyl group and (meth)acryloyloxy group, in the molecular unit thereof, it is extensively used in the form of a homopolymer or a copolymer as in coating materials, adhesive agents, textile processing agents, and ultraviolet curing resins.

Typical examples of the hydroxyl group-containing (meth)acrylate heretofore known to the art are hydroxyalkyl (meth)acrylates such as hydroxyethyl acrylate and hydroxyethyl methacrylate, polyalkylene glycol mono(meth)acrylates, ε-caprolactone-adduct hydroxyethyl (meth)acrylate produced by the addition reaction of ε-caprolactone on hydroxyethyl (meth)acrylate, glycerol mono(meth)acrylate, and pentaerythritol tri(meth)acrylate. When any of the conventionally known hydroxyl group-containing (meth)acrylates is used alone, desired impartation of necessary functions cannot be attained. In the circumstance, the desirability of developing a hydroxyl group-containing (meth)acrylate possessing a novel structure has been finding growing recognition.

The urethane (meth)acrylate prepolymer, popularly called the urethane (meth)acrylate, which is obtained by the reaction of the hydroxyl group-containing (meth)acrylate with an isocyanate compound is an important component for the production of a thermosetting resin or a photosetting resin and is extensively used in coating materials, adhesive agents, inks, hard coats, resists, etc. The urethane (meth)acrylate prepolymer generally is produced by the reaction of a polyol and a polyisocyanate upon the hydroxyalkyl (meth)acrylate. Heretofore, numerous species of urethane (meth)acrylate prepolymer have been synthesized by varying the kinds and molecular weights of the raw materials, the mixing ratios of the raw materials, and the sequence of reactions involved. Most of the known prepolymers, however, are liquids of unusually high viscosity or solids and are required to be used in a form incorporating therein a large amount of a reactive diluent. None of these known prepolymers manifest all the curing properties such as the speed of curing, the rigidity of cured polymer produced, and the fastness of adhesion at satisfactory levels. Thus, the desirability of developing a urethane (meth)acrylate prepolymer possessing low viscosity and high curing speed and excelling in such curing properties as the rigidity of a cured polymer produced and the fastness of adhesion has been finding growing acceptance.

The carboxyl group-containing (meth)acrylate is an important component for the production of a thermosetting resin or photosetting resin and is finding extensive utility in numerous applications to coating materials, adhesive agents, inks, hard coats, resists, surface-improving agents, and dental cement. Generally, the carboxyl group-containing (meth)acrylate is produced by the reaction of the hydroxyl group-containing (meth)acrylate with a polybasic carboxylic acid or a polybasic carboxylic anhydride. For this purpose, the reaction with a polybasic carboxylic anhydride represented by the following reaction formula proves advantageous.

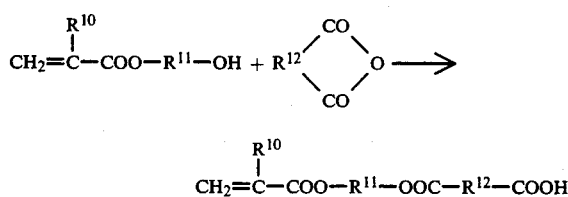

wherein $R^{10}$ stands for hydrogen atom or methyl group, $R^{11}$ for a divalent organic group, and $R^{12}$ for a carboxylic anhydride residue.

Heretofore, numerous species of carboxyl group-containing (meth)acrylates have been synthesized by varying the kinds of these raw materials. These carboxyl group-containing (meth)acrylates are used in a rich variety of applications as described above and, therefore, are required to possess structures suitable for such applications. In the circumstance, the desirability of developing a carboxyl group-containing (meth)acrylate possessing a structure unknown to the art and excelling in the curing properties has been finding growing approval.

Epoxy (meth)acrylates and hydroxyalkyl (meth)acrylates are well-known typical examples of the hydroxyl group-containing (meth)acrylate prepolymer. Such a hydroxyl group-containing (meth)acrylate prepolymer constitutes a component used for the production of a thermosetting resin or photosetting resin and is finding extensive utility in applications to coating materials, adhesive agents, inks, sealing agents, resists, and surface-modifying materials. Heretofore, numerous species of hydroxyl group-containing (meth)acrylate prepolymers have been synthesized by varying the kinds of raw materials and the reaction conditions involved. These hydroxyl group-containing (meth)acrylate prepolymers are used in a rich variety of applications as described above and they are required to possess peculiar structures suitable for these varying applications. Thus, the desirability of developing a hydroxyl group-containing (meth)acrylate prepolymer possessing a structure unknown to the art and excelling in the curing properties has been finding mounting approval.

The resins which are cured by radiations such as ultraviolet ray and electron beam excel the thermosetting resins which are cured by heat in terms of saving of resources, freedom from environmental pollution, and rapidity of curing and, therefore, find extensive utility. Generally, radiation-curing type resin compositions are compounded of such resin components as unsaturated polyesters and prepolymers of polyester (meth)acrylates, urethane (meth)acrylates, epoxy (meth)acrylates, and polyether (meth)acrylates and reactive diluent components such as mono(meth)acrylates like tetrahydrofurfuryl (meth)acrylate and phenoxyethyl (meth)acrylate and polyol poly(meth)acrylates like 1,6-hexanediol di(meth)acrylate and trimethylolpropane tri(meth)acrylate. Numerous species of radiation-curing resin compositions suitable for varying applications have heretofore been obtained by varying the mixing ratios of these components. By merely mixing these known components, however, it is difficult to obtain resin compositions which manifest curing speed and curing properties in balanced conditions. The desirability of developing a novel radiation-curing type resin composition manifesting curing speed and all the curing properties in balanced conditions has been finding growing approval.

An object of this invention, therefore, is to provide a novel hydroxyl group-containing (meth)acrylate oligomer, a method for the production of the oligomer, a prepolymer from the oligomer, a method for the production of the prepolymer, and a method for the use of the oligomer and the prepolymer.

SUMMARY OF THE INVENTION

The object described above is accomplished by a hydroxyl group-containing (meth)acrylate oligomer represented by the general formula I:

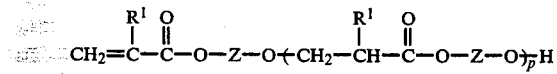

wherein two $R^1$'s independently stand for hydrogen atom or methyl group, two Z's independently stand for a divalent organic group of 2 to 20 carbon atoms, and p stands for an integer of the value of 1 to 100.

The object of this invention further is accomplished by a method for the production of a hydroxyl group-containing (meth)acrylate oligomer represented by the general formula I:

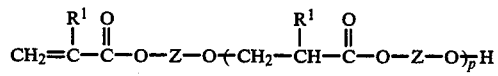

wherein $R^1$'s, Z's, and p have the same meanings as defined above, characterized by addition polymerizing a hydroxyl group-containing (meth)acrylate represented by the general formula IV:

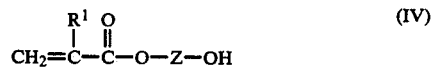

wherein $R^1$ and Z have the same meanings as defined above, in the presence of a catalyst thereby oligomerizing the hydroxyl group-containing (meth)acrylate.

DESCRIPTION OF PREFERRED EMBODIMENT

Figure 1:
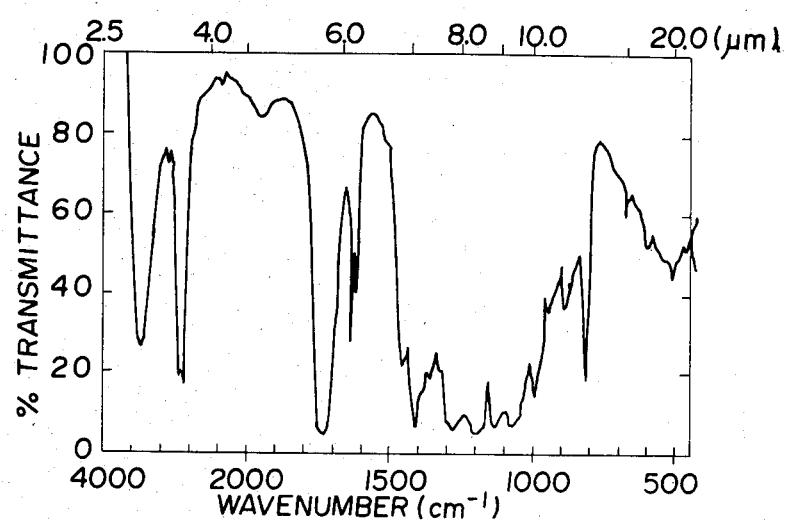
FIG. 1 is an IR spectrum diagram of a typical hydroxyl group-containing (meth)acrylate oligomer according with this invention.

The hydroxyl group-containing (meth)acrylate oligomers of the present invention are represented by the general formula I. As desirable typical examples of the divalent organic groups of 2 to 20 carbon atoms represented by the symbol Z in this general formula, there may be cited straight or branched divalent hydrocarbon groups of 2 to 20, preferably 2 to 10 carbon atoms and divalent organic groups of 2 to 20, preferably 2 to 10 carbon atoms having a divalent hydrocarbon group attached thereto through the medium of an ether bond. Further, the corresponding divalent organic groups which have a divalent hydrocarbon group attached thereto through the medium of a thioether bond, a urea bond, an amide bond, a thioamide bond, a carbonyl group, or a sulfonyl group respectively in the place of the ether bond are also desirable examples.

As a method for the production of a hydroxyl group-containing (meth)acrylate oligomer represented by the general formula I, the method which comprises addition polymerizing a hydroxyl group-containing (meth)acrylate represented by the general formula IV:

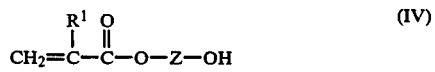

wherein $R^1$ and Z have the same meanings as defined above, thereby oligomerizing the (meth)acrylate may be cited. When a method of production of this kind is adopted, the reaction is desired to be carried out in the presence of a catalyst. Examples of the catalyst usable advantageously in the reaction include protonic acids such as sulfuric acid and paratoluene-sulfonic acid; Lewis acids such as boron trifluoride, boron trifluoride etherate, tin tetrachloride, and antimony pentachloride; oxysulfates such as titanium oxysulfate and molybdenum oxysulfate; heteropoly acids such as tungsto-phosphoric acid, tungsto-silicic acid, tungsto-boric acid, molybdo-phosphoric acid, and molybdo-silicic acid, and salts thereof; oxy acids such as molybdic acid and tungstic acid and isopoly acids which are condensed acids of such oxy acids and salts thereof. Among the catalysts cited above, hetero-poly acids and salts thereof exhibit high catalytic activity at a low reaction temperature and enable the reaction to proceed at a relatively low temperature and, therefore, avoid entailing the possibility of exposing the raw materials and the reaction product to thermal polymerization by the vinyl group. They are particularly desirable further because they hardly induce corrosion of the apparatus used for the reaction as compared with protonic acids such as sulfuric acid and Lewis acids such as boron trifluoride. Not merely one member but also a mixture of two or more members selected from the group of catalysts enumerated above can be effectively used for the reaction mentioned above. The amount of the catalyst to be used is desired to not less than 0.01% by weight, preferably to fall in the range of 0.05 to 10% by weight, based on the amount of the hydroxyl group-containing (meth)acrylate. If this amount is as small as less than 0.01% by weight, the catalyst manifests the catalytic activity with difficulty. If the amount exceeds 10% by weight, there are times when the excess amount will be wasted without bringing about a proportional addition to the catalytic activity. Most of the catalysts are easily soluble in the hydroxyl group-containing (meth)acrylates as the raw material. When the particular catalyst selected happens to be thus soluble, the reaction proceeds in a homogeneous solution. When the catalyst happens to be incompletely soluble, the reaction proceeds in a suspension. The catalyst can be used in its unaltered form. It may be used, when necessary, as deposited on a suitable carrier such as, for example, silica, alumina, activated carbon, titania, zeolite, ion-exchange resin, or diatomaceous earth.

Typical examples of the hydroxyl group-containing (meth)acrylate represented by the general formula IV include hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, hydroxyhexyl methacrylate, diethylene glycol monoacrylate, diethylene glycol monomethacrylate, dipropylene glycol monoacrylate, dipropylene glycol monomethacrylate, hydroxycyclohexyl acrylate, and hydroxycyclohexyl methacrylate. They may be used either independently or in the form of a mixture of two or more members.

The reaction is desired to be carried out at a temperature in the range of 10° to 150° C., preferably 30° to 120° C. If the reaction temperature is higher, the vinyl group of the hydroxyl group-containing (meth)acrylate as the raw material and that of the hydroxyl group-containing (meth)acrylate oligomer as the reaction product are liable to undergo polymerization. If the reaction temperature is too low, the reaction velocity is intolerably low. The reaction is not always required to be carried out at a fixed temperature. The reaction temperature may be different in the first half and in the last half of the entire period of the reaction. The reaction is desired to be carried out in the presence of a polymerization inhibitor for the purpose of preventing the vinyl group of the raw material and that of the reaction product from undergoing polymerization.

When hydroxyethyl acrylate or methacrylate available in the market is used as the hydroxyl group-containing (meth)acrylate or methacrylate, the ester is already containing a polymerization inhibitor. It may additionally incorporate therein, when necessary, such a polymerization inhibitor before it is put to use in the reaction. Examples of the polymerization inhibitor include hydroquinone, hydroquinone monomethyl ether, p-benzoquinone, methyl hydroquinone, t-butyl hydroquinone, di-t-butyl hydroquinone, t-butyl catechol, phenothiazine, N,N'-di-2-naphthyl-p-phenylene diamine, 4,6-dinitro-o-cresol, N-nitrosodiphenyl amine, α-naphthol, and copper salts. The amount of the polymerization inhibitor to be used generally falls in the range of 0.005 to 1% by weight.

The reaction pressure is not specifically limited. Generally, the reaction is desired to be carried out under atmospheric pressure. The reaction time depends on the kinds of the catalyst to be used, the amount of the catalyst added, and the reaction temperature. Generally it falls in the range of 1 to 48 hours, preferably 1 to 24 hours. This reaction can be carried out in the absence of a solvent. Optionally, it may be carried out in a solvent. Typical examples of the solvent usable for the reaction are ethers such as dipropyl ether and hydrocarbons such as benzene, toluene, cyclohexane, hexane, and heptane.

The manner in which the raw materials are added to the reaction vessel is not specifically limited. It may be suitably selected depending on the kinds of raw materials used, the reaction temperature, the heating or cooling capacity of the reaction vessel, etc. The method which comprises having the raw materials, the catalyst, the solvent, and the polymerization inhibitor already mixed by the time the reaction is started, the method which comprises continuing the reaction while adding part of the raw materials to the reaction system, or the method which comprises continuing the reaction while adding part of the catalyst to the reaction system may be used. The reaction can be performed either batchwise or continuously. Generally, the reaction can be carried out while keeping the reaction system swept with an ambient gas. Examples of the ambient gas are nitrogen, air, and air diluted with nitrogen gas.

In the present invention, the polymerization of the hydroxyl group-containing (meth)acrylate as the raw material and the consequent formation of the corresponding oligomer are caused to proceed by the fact that the hydroxyl group in one molecule of the acrylate is added to the double bond of the (meth)acryloyloxy group of another molecule of the acrylate. The average molecular weight of the hydroxyl group-containing (meth)acrylate oligomer represented by the general formula I, therefore, can be freely varied by suitably selecting such reaction conditions as the reaction time, the reaction temperature, the kind of the catalyst, the catalyst concentration in the reaction system, and the manner of addition of the raw material.

When the hydroxyl group-containing (meth)acrylate, the raw material, remains unaltered in the reaction product and threatens to do harm to the product, it can be removed from the product by distillation or extraction. Optionally, the unaltered hydroxyl group-containing (meth)acrylate may be left unremoved from the produced hydroxyl group-containing (meth)acrylate oligomer and the oligomer in the form of a mixture with the unaltered acrylate may be put to use in various applications.

The reaction solution in which the reaction has been completed contains the catalyst. So long as the catalyst content is small, the reaction solution containing the catalyst may be put to use in its unmodified form. If the catalyst content is large, the remaining catalyst is desired to be removed from the reaction solution before the reaction solution is put to use. The removal of the catalyst and a by-product occurring in a small amount from the reaction system can be effected by any of various methods. For example, they can be removed through adsorption by allowing the reaction solution to contact such an adsorbent as magnesium oxide, calcium oxide, aluminum oxide, silicon oxide, magnesium hydroxide, calcium hydroxide, magnesium silicate, or alumina magnesium hydroxide. Where an acidic catalyst has been used, removal of the remaining catalyst from the reaction solution can be attained by adding a very small amount of a hydroxide, oxide of an alkali metal or alkaline earth metal, or organic amine to the reaction solution thereby causing precipitation of the acidic catalyst and subsequently filtering the reaction solution or treating it with an adsorbent. Otherwise, the reaction solution containing the catalyst can be purified by washing the reaction solution with an aqueous alkali or acid solution or with water and subsequently dehydrating the washed reaction solution. When the reaction solution is washed with the aqueous alkali or acid solution or with water, since it is soluble in water, it is desired to be dissolved in hexane or benzene and then subjected to the washing in the form of a hydrocarbon solution to minimize the loss of the reaction product. After the washing, the solution is distilled to expel the solvent and obtain the product in high purity.

The hydroxyl group-containing (meth)acrylate oligomer of a novel structure obtained by this invention may be polymerized to produce a hydroxyl group-containing (co)polymer or may be caused to react with a compound possessing an epoxy group, an isocyanate group, or some other reactive group and thereafter copolymerized with other vinyl monomer. The (co)polymers so produced can be utilized extensively in numerous applications such as to coating materials, adhesive agents, textile modifiers, resins curable with ultraviolet ray or electron beam, inorganic pigment dispersants, and scale-proofing agents.

This invention further relates to a urethane (meth)acrylate prepolymer represented by the general formula II:

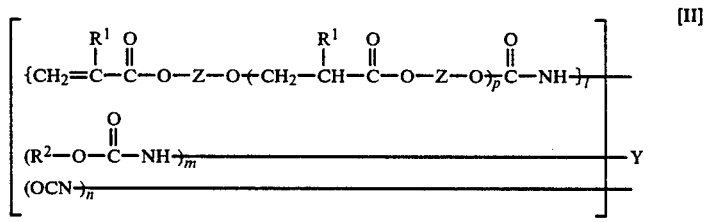

wherein two $R^1$'s independently stand for hydrogen atom or methyl group, two Z's independently stand for a divalent organic group of 2 to 20, preferably 2 to 10 carbon atoms, p stands for an integer of the value of 1 to 100, preferably 1 to 20, $R^2$ stands for a residue of a hydroxyl group-containing organic compound (with the exception of the hydroxyl group-containing (meth)acrylate oligomer represented by the aforementioned general formula I), l stands for an integer of the value of 1 to 6, preferably 1 to 4, m stands for 0 or an integer of the value of 1 to 5, preferably 0 to 2, n stands for 0 or an integer of the value of 1 to 5, preferably 0 to 2, l+m+n is an integer of the value of 1 to 6, preferably 1 to 4, and Y stands for a residue of an isocyanate group-containing organic compound of a valency of (l+m+n).

This invention also relates to a method for the production of a urethane (meth)acrylate prepolymer represented by the general formula II:

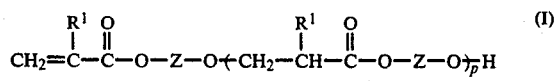

wherein $R^1$, Z, p, l, m, n, and Y have the same meanings as defined above, characterized by causing (A) a hydroxyl group-containing (meth)acrylate oligomer represented by the general formula I:

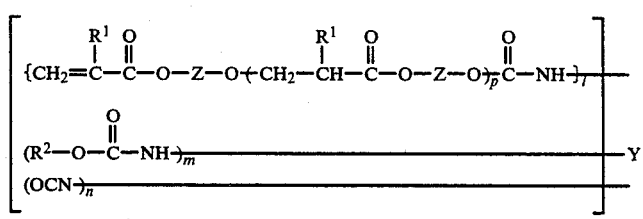

wherein $R^1$, Z, and p have the same meanings as defined above, to react with (B) an isocyanate group-containing organic compound represented by the general formula, Y—NCO$_{l+m+n}$, wherein Y stands for a residue of an isocyanate group-containing organic compound of a valency of (l+m+n) and l+m+n is an integer of the value of 1 to 6, preferably 1 to 4, and optionally further with (C) a hydroxyl group-containing organic compound other than the hydroxyl group-containing (meth)acrylate oligomer represented by the aforementioned general formula I.

To be more precise, this invention relates to a novel urethane (meth)acrylate prepolymer obtained by the reaction of an isocyanate group-containing compound with a compound containing a hydroxyl group and an unsaturated group, which prepolymer is characterized by using, as the compound containing a hydroxyl group and an unsaturated group, a specific hydroxyl group-containing (meth)acrylate oligomer (A) represented by the general formula I, and to a method for the production of the prepolymer.

The urethane (meth)acrylate prepolymer of the present invention is obtained by causing (A) the hydroxyl group-containing (meth)acrylate oligomer represented by the general formula I to react with (B) the isocyanate group-containing organic compound represented by the general formula and optionally further with (C) the hydroxyl group-containing organic compound other than the hydroxyl group-containing (meth)acrylate oligomer of (A).

The isocyanate group-containing organic compound (B) to be used in this invention is one member or a mixure of two or more members selected from the monoisocyanates (B1), polyisocyanates (B2), and terminal isocyanate group-containing prepolymers (B3) which will be enumerated below. In the isocyanate group-containing organic compounds of (B), those which contain two or more isocyanate groups in the molecular unit thereof will be collectively referred to as "polyisocyanate group-containing organic compound (B4)."

Typical examples of the monoisocyanate (B1) include methyl isocyanate, ethyl isocyanate, propyl isocyanate, butyl isocyanate, hexyl isocyanate, chloroethyl isocyanate, isocyanate ethyl methacrylate, octadecyl isocyanate, phenyl isocyanate, ethoxyphenyl isocyanate, chlorophenyl isocyanate, benzyl isocyanate, naphtyl isocyanate, and dichlorophenyl isocyanate. Typical examples of the polyisocyanate (B2) include ethylene diisocyanate, trimethylene diisocyanate, 1,4-tetramethylene diisocyanate, 1,6-hexamethylene diisocyanate, trimethylhexamethylene diisocyanate, 1,10-decamethylene diisocyanate, octadecamethylene diisocyanate, lysine diisocyanate, o-, m-, and p-phenylene diisocyanate, 4-isopropyl-1,3-phenylene diisocyanate, 4-methoxy-1,3-phenylene diisocyanate, 2,4- and 2,6-tolylene diisocyanate, xylylene diisocyanate, m- and p-tetramethylxylylene diisocyanate, 1,4-naphthylene diisocyanate, 4,4'-diphenyl methane diisocyanate, 3,3'-dimethyl-4,4'-diphenyl methane diisocyanate, 2,4-diisocyanate diphenyl ether, 3,3'-dimethyl-4,4'-biphenylene diisocyanate, 3,3'-dichloro-4,4'-biphenylene diisocyanate, triphenyl methane triisocyanate, tris-(p-isocyanatophenyl)thiophosphite, polymethylene polyphenyl isocyanate (novolak type polyisocyanate), 1,4-cyclohexylene diisocyanate, hydrogenated tolylene diisocyanate, hydrogenated xylylene diisocyanate, hydrogenated 4,4'-diphenyl methane diisocyanate, 1,5-tetrahydronaphthalene diisocyanate, isophorone diisocyanate, diphenylsulfone diisocyanate, isocyanate polymers such as 1,6-hexamethylene diisocyanate dimer and 2,4-tolylene diisocyanate dimer, and crude products such as tolylene diisocyanate and 4,4'-diphenyl methane diisocyanate. Typical examples of the terminal isocyanate group-containing prepolymer (B3) include those prepolymers containing an isocyanate group at the terminal which are obtained by causing the polyisocyanates (B2) to react with such hydroxyl group-containing compounds as polyols (C1), polyether polyols (C2), polyester polyols (C3), ester diols (C4), polyolefin polyols (C5), and polycarbonate polyols (C6) to be enumerated below, with the ratio of the number of isocyanate groups/number of hydroxyl groups fixed at least at 1.0.

Typical examples of the polyol (C1) to be used for the synthesis of the terminal isocyanate group-containing prepolymer (B3) include ethylene glycol, propylene glycol, trimethylene glycol, 1,2-, 1,3-, and 1,4-butanediol, 1,5-pentanediol, hexanediol, neopentyl glycol, dibromo-neopentyl glycol, trimethyl pentanediol, trimethylolethane, trimethylolpropane, pentaerythritol, dipentaerythritol, cyclohexanediol, cyclohexane dimethanol, glycerol, diglycerol, sorbitol, tris-hydroxyethyl isocyanurate, bisphenol A, 2,2'-di(4-hydroxypropoxyphenyl)propane, hydrogenated bisphenol A, triethanolamine, and N,N,N',N'-tetrakis($\beta$-hydroxyethyl) ethylenediamine. Typical examples of the polyether polyol (C2) include diethylene gycol, triethylene glycol, tetraethylene glycol, polyethylene glycol, and dipropylene glycol. Typical examples the polyester polyol (C3) include polyester polyols such as bis(2-hydroxyethyl)-terephthalate which are obtained by causing the polyols (C1) and/or polyether polyols (C2) to react with polycarboxylic acids (such as phthalic anhydride, maleic anhydride, succinic anhydride, dodecinyl-succinic anhydride, citraconic anhydride, trimellitic anhydride, pyromellitic anhydride, methylcyclohexene tricarboxylic anhydride, tetrahydrophthalic anhydride, hexahydrophthalic anhydride, 3,6-endomethylene-tetrahydrophthalic anhydride, tetrachlorophthalic anhydride, chlorendic anhydride, orthophthalic acid, isophthalic acid, terephthalic acid, maleic acid, fumaric acid, succinic acid, adipic acid, azelaic acid, sebacic acid, trimellitic acid, and pyromellitic acid), with the ratio of the number of hydroxyl groups/number of carboxyl groups fixed at least at 1.0. Typical examples of the ester diol (C4) include 2,2-dimethyl-3-hydroxypropyl-2,2-dimethyl-3-hydroxypropionate(hydroxypivalyl-hydroxypivalate), 2,2-dimethyl-2-hydroxybutyl-2,2-dimethyl-4-hydroxy butyrate, and 2-ethyl-2-methyl-3-hydroxypropyl-2-ethyl-2-methyl-3-hydroxypropionate. Typical examples of the polyolefin polyol (C5) include polybutadiene polyol. Typical examples of the polycarbonate polyol (C6) include the reaction product of 1,6-hexane diol with ethylene carbonate. Further, hydroxyl group-containing compounds such as adduct of ethylene oxide to trimethylolpropane, adduct of $\epsilon$-caprolactone to neopentyl glycol, adduct of butyl glycidyl ether to the terminal hydroxyl group-containing polyester polyol produced from butylene glycol, azelaic acid, and isophthalic acid, adduct of $\epsilon$-caprolactone to hydroxypivalyl-hydroxypivalate, adduct of propylene oxide to polybutadienediol, and adduct of ethylene oxide to the (1:1) reaction product of 1,6-hexanediol and ethylene carbonate which are obtained by causing a ring-opening addition reaction of the aforementioned polyols (C1), polyether polyols (C2), polyester polyols (C3), ester diols (C4), polyolefin polyols (C5), and polycarbonate polyols (C6) with one cyclic compound or a mixture of two or more cyclic compounds selected from the group consisting of ethylene oxide, propylene oxide, butylene oxide, styrene oxide, higher fatty acid monoepoxide, epichlorohydrin, allyl glycidyl ether, butyl glycidyl ether, glycidol, phenyl glycidyl ether, tetrahydrofuran, and $\epsilon$-caprolactone can also be converted by reaction with polyisocyanates (B2) into terminal isocyanate group-containing prepolymers (B3). The ring-opening addition reaction of a cyclic compound can be carried out by any of the known methods. Generally, this reaction is desired to be carried out in the presence of a catalyst. Examples of the catalyst usable effectively herein include Lewis acids, organic titanium compounds, and organic tin compounds.

As the hydroxyl group-containing organic compound (C) which is optionally used as described above, any of the organic compounds which exclude the aforementioned hydroxyl group-containing (meth)acrylate oligomer of (A) and which contain at least one hydroxyl group capable of reacting with an isocyanate group can be used without any specific limitation. Typical examples of the hydroxyl group-containing organic compound (C) include the polyols (C1), polyether polyols (C2), polyester polyols (C3), ester diols (C4), polyolefin polyols (C5), and polycarbonate polyols (C6) which are used for the production of terminal isocyanate group-containing prepolymers (B3) and the adducts of cyclic compounds thereto [hereinafter collectively referred to as "polyol compounds (C1 through C6)]; aliphatic monohydric alcohols such as methanol, ethanol, propanol, and butanol; (poly)alkylene glycol monoalkyl ethers such as ethylene glycol monomethyl ether and diethylene glycol monobutyl ether; and (poly)alklene glycol monoalkyl esters such as ethylene glycol monoacetyl ester. Of course, those compounds containing a hydroxyl group and an ethylenically unsaturated group in the molecular unit thereof such as, for example unsaturated acid partial esterification products of polyol compounds (C1 through C6) such as 1,4-butanediol mono(meth)acrylate, 1,6-hexanediol mono(meth)acrylate, neopentyl glycol mono(meth)acrylate, trimethylol propane mono(meth)acrylate, trimethylol propane di(meth)acrylate, pentaerytritol di(meth)arylate, pentaerythritol di(meth)acrylate, pentaerythritol tri(meth)acrylate, glycerol mono(meth)acrylate, diglycerol tri(meth)acrylate, hydrogenated bisphenol-A mono(meth-)acrylate, di(meth)acrylate of trimethylol propane having 6 mols of ethylene oxide adduct thereto, hydroxyethyl (meth)acrylate, hydroxypropyl (meth)acrylate, diethylene glycol mono(meth)acrylate, polyethylene glycol mono(meth)acrylate, dipropylene glycol mono(-meth)acrylate, and polypropylene glycol mono(meth)acrylate: adducts of cyclic compound (aliphatic glycidyl ethers such as butyl glycidyl ether and allyl glycidyl ether, aromatic glycidyl ethers such as phenyl glycidyl ether, epichlorohydrin, ε-caprolactone, and tetrahydrofuran) to hydroxyalkyl(meth)acrylates such as hydroxyethyl (meth)acrylate having two mols of ε-caprolactone adduct thereto in the case of a ε-caprolactone-added hydroxyalkyl (meth)acrylate; addition reaction products of compounds containing an epoxy group and compounds containing an ethylenically unsaturated group such as adducts of (meth)acrylic acid to such monoepoxides as butyl glycidyl ether, phenyl glycidyl ether, allyl glycidyl ether, epichlorohydrin, and glycidyl (meth)acrylate and adducts of (meth)acrylic acid to such polyepoxides as ethylene glycol diglycidyl ether, polyethylene glycol diglycidyl ether, propylene glycol diglycidyl ether, neopentyl glycol diglycidyl ether, and N,N-diglycidyl aniline can be used as hydroxyl group-containing organic compounds (C). One member or a mixture of two or more members selected from the group of hydroxyl group-containing organic compounds (C) enumerated above can be effectively used.

The urethane (meth)acrylate prepolymer of the present invention can be produced by any of the conventional methods. For example, it can be produced by the reaction of a hydroxyl group-containing (meth)acrylate oligomer represented by the general formula I with an isocyanate group-containing organic compound (B) or by the reaction of the hydroxyl group-containing (meth)acrylate oligomer represented by the general formula I with a hydroxyl group-containing organic compound (C) and a polyisocyanate group-containing organic compound (B4).

The amounts in which the raw materials are added to the reaction vessel may be suitably selected in accordance with the particular species of urethane (meth)acrylate prepolymer desired to be obtained. Generally, it is sufficient to use the raw materials in amounts such that the ratio of the number of isocyanate groups/number of hydroxyl groups will fall in the range of 1.0±0.1. It is permissible to use the hydroxyl group-containing organic compound (C) in a large excess. In this case, the hydroxyl group-containing organic compound residue represented by the symbol $R^2$ which is included in the general formula II representing the urethane (meth)acrylate prepolymers is destined to contain a hydroxyl group. It is also permissible to use, as the isocyanate group-containing organic compound (B), an organic compound possessing a hydroxyl group or other similar functional group in addition to an isocyanate group. In this case, the isocyanate group-containing organic compound residue represented by the symbol Y which is included in the general formula II possibly contains other functional group.

The sequence in which the raw materials for the reaction are added to the reaction vessel is not sepcifically limited. When any of the polyol compounds (C1 through C6) is used as the hydroxyl group-containing organic compound (C), it is advantageous to have the selected polyol compound react with the polyisocyanate group-containing organic compound (B4) in advance. The method of this invention for the production of the urethane (meth)acrylate prepolymer can be embodied in various procedures as follows.

(a) The procedure which comprises causing a hydroxyl group-containing (meth)acrylate oligomer (A) represented by the general formula I to react with an isocyanate group-containing organic compound (B).

(b) The procedure which comprises causing a hydroxyl group-containing (meth)acrylate oligomer (A) represented by the general formula I to react with a polyisocyanate group-containing organic compound (B4) in a ratio enough to permit occurrence of a residual isocyanate group and subsequently causing a hydroxyl group-containing organic compound (C) to react upon the resultant reaction product.

(c) The procedure which comprises causing a hydroxyl group-containing organic compound (C) to react with a polyisocyanate group-containing organic compound (B4) in a ratio enough to permit occurrence of a residual isocyanate group and subsequently causing a hydroxyl group-containing (meth)acrylate oligomer (A) represented by the general formula I to react upon the resultant reaction product.

(d) The procedure which comprises mixing a hydroxyl group-containing (meth)acrylate oligomer (A) represented by the general formula I with a hydroxyl group-containing organic compound (C) and causing the mixture to react with a polyisocyanate group-containing organic compound (B4).

(e) The procedure which comprises causing a hydroxyl group-containing organic compound (C) to react with a polyisocyanate group-containing organic compound (B4) in a ratio enough to permit occurrence of a residual isocyanate group, then causing a hydroxyl group-containing (meth)acrylate oligomer (A) to react with the resultant reaction product in a ratio enough to permit occurrence of a residual isocyanate group, and thereafter causing a hydroxyl group-containing organic compound (C) to react upon the resultant reaction product.

(f) The procedure which comprises causing a hydroxyl group-containing organic compound (C) to react with a polyisocyanate group-containing organic compound (B4) in a ratio enough to permit occurrence of a residual isocyanate group and subsequently allowing the resultant reaction product to be reacted upon by a mixture of a hydroxyl group-containing (meth)acrylate oligomer (A) represented by the general formula I with a hydroxyl group-containing organic compound (C).

(g) The procedure which comprises causing a hydroxyl group-containing (meth)acrylate oligomer (A) represented by the general formula I to react with a polyisocyanate group-containing organic compound (B4) in a ratio enough to permit occurrence of a residual isocyanate group, then causing a hydroxyl group-containing organic compound (C) to react upon the resultant reaction product in a ratio enough to permit occurrence of a residual isocyanate group, and thereafter causing a hydroxyl group-containing (meth)acrylate oligomer (A) represented by the general formula I to react upon the resultant reaction product.

(h) The procedure which comprises causing a hydroxyl group-containing (meth)acrylate oligomer (A) represented by the general formula I to react with a polyisocyanate group-containing organic compound (B4) in a ratio enough to permit occurrence of a residual isocyanate group, then admixing the resultant reaction solution with a polyisocyanate group-containing organic compound (B4), and thereafter causing a hydroxyl group-containing organic compound (C) to react upon the resultant mixture.

(i) The procedure which comprises causing a hydroxyl group-containing (meth)acrylate oligomer (A) represented by the general formula I with a polyisocyanate group-containing organic compound (B4) in a ratio enough to permit occurrence of a residual isocyanate group, then admixing the resultant reaction product with a polyisocyanate group-containing organic compound (B4), and causing the resultant mixture to react with a mixture of a hydroxyl group-containing (meth)acrylate oligomer (A) represented by the general formula I with a hydroxyl group-containing organic compound (C).

The reaction of the method of this invention is desired to be carried out at a temperature in the range of 10° to 150° C., preferably 30° to 100° C. If the reaction temperature is higher, the vinyl group of the raw materials and the vinyl group of the reaction product are more susceptible of polymerization. If the reaction temperature is too low, the reaction velocity is lower than is tolerated. The reaction is desired to be carried out in the presence of a polymerization inhibitor for the purpose of preventing the vinyl group of the raw materials and the vinyl group of the reaction product from polymerization. Typical examples of the polymerization inhibitor are equal to those already enumerated. The amount in which the polymerization inhibitor is added to the reactants generally falls in the range of 0.005 to 1% by weight based on the total amount of the raw materials. Further, this reaction can be carried out in the presence of any of the known catalysts such as, for example, dibutyl tin dilaurate, dioctyl tin dilaurate, other similar organic tin compounds, and tertiary amines for the purpose of promoting urethanation of the isocyanate group with the hydroxyl group. The reaction can be carried out, when necessary, in a suitable solvent. The solvent so used is not specifically limited. Typical examples of the solvent usable advantageously herein include reactive solvents such as styrene, vinyl acetate, methyl (meth)acrylate, ethylene glycol di(meth)acrylate, 1,6-hexanediol di(meth)acrylate, neopentyl glycol di(meth)acrylate, polyethylene glycol di(meth)acrylate, trimethylolpropane tri(meth)acrylate, pentaerythritol tetra(meth)acrylate, methoxyethyl(meth)acrylate, phenoxyethyl(meth)acrylate, and tetrahydrofurfuryl(meth)acrylate, and aromatic hydrocarbons such as benzene, toluene, and xylene; ketones such as acetone, methylethyl ketone, methylisobutyl ketone, and cyclohexanone; esters such as methyl acetate, ethyl acetate, propyl acetate, and butyl acetate; ethers such as isopropyl ether, dioxane, and tetrahydrofuran; and halogenated hydrocarbons such as methylene chloride, chloroform, trichloroethylene, and ethylene dichloride.

The novel urethane (meth)acrylate prepolymer synthesized as described above may be polymerized to produce a (co)polymer containing a urethane bond or may be combined with ethylenically unsaturated compounds, various polymers (such as, for example, unsaturated polyester type, epoxy type, polyamide type, acryl type, and polyvinyl alcohol type resins), organic solvents, fillers, tackifier, stabilizers, plasticizers, levelling agent, dyestuffs, and pigments to produce compositions containing a urethane (meth)acrylate prepolymer represented by the general formula II as an essential component thereof. These compositions find extensive utility in coating materials, adhesive agents, inks, resins curable with ultraviolet ray or electron beam, hard coats, resists, protective films for printed-circuit boards, sealing agents, binders, and insulating varnishes.

This invention further relates to a carboxyl group-containing (meth)acrylate prepolymer represented by the general formula III:

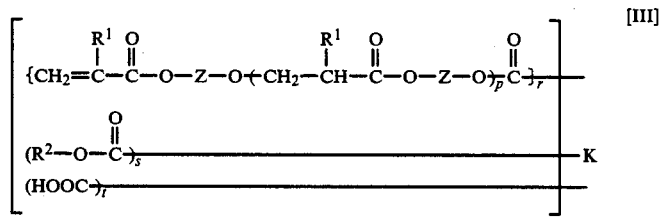

wherein two $R^1$'s independently stand for a hydrogen atom or a methyl group, two Z's independently stand for a divalent organic group of 2 to 20, preferably 2 to 10 carbon atoms, p stands for an integer of the value of 1 to 100, preferably 1 to 20, $R^2$ stands for a residue of a hydroxyl group-containing organic compound with the exception of a hydroxyl group-containing (meth)acrylate oligomer represented by the general formula I, r stands for an integer of the value of 1 to 3, preferably 1 to 2, s stands for 0 or an integer of the value of 1 or 2, t stands for an integer of the value of 1 to 5, preferably 1 to 2, r+s+t is an integer of the value of 2 to 6, preferably 2 to 4, and K stands for a residue of a carboxylic acid of a valency of (r+s+t) or anhydride thereof.

Further, this invention relates to a method for the production of a carboxyl group-containing (meth)acrylate prepolymer represented by the general formula III:

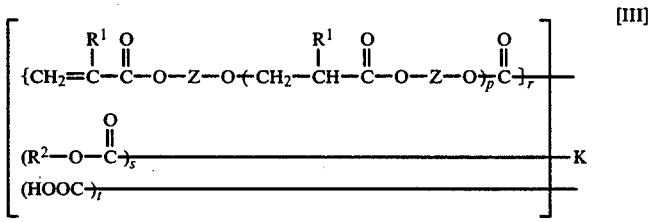

wherein K stands for a residue of a carboxylic anhydride of a valency of (r+s+t) (providing that one of the acid anhydride groups is divalent), r stands for an integer of the value of 1 to 3, preferably 1 to 2, s stands for 0 or an integer of the value of 1 or 2, r+s is an integer of the value of 1 to 3, preferably 1 to 2, t stands for an integer of the value of 1 to 5, preferably 1 to 3, and t−r−s is 0 or an integer of the value of 1 to 4, preferably 0 to 2, and $R^1$, $R^2$, Z, and p have the same meanings as defined above, characterized by causing a hydroxyl group-containing (meth)acrylate oligomer (A) represented by the general formula I to react with at least one compound (D) selected from the group consisting of carboxylic acids (D1) represented by the general formula:

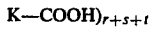

K—COOH)$_{r+s+t}$ wherein K and r+s+t have the same meanings as defined above, and carboxylic anhydrides (D2) represented by the general formula:

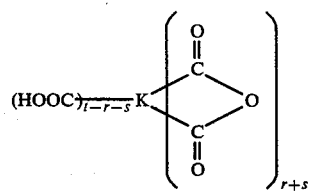

wherein K, r, s, and t have the same meanings as defined above, r+s is an integer of the value of 1 to 3, preferably 1 to 2, and t−r−s is 0 or an integer of the value of 1 to 4, preferably 0 to 2, optionally further with a hydroxyl group-containing organic compound (C) other than a hydroxyl group-containing (meth)acrylate oligomer (A) defined by the aforementioned general formula.

To be more precise, this invention relates to a novel carboxyl group-containing (meth)acrylate prepolymer obtained by the reaction of a polybasic carboxylic acid or anhydride with a compound possessing a hydroxyl group and an unsaturated group, characterized by using as the compound possessing a hydroxyl group and an unsaturated group, a specific hydroxyl group-containing (meth)acrylate oligomer (A) represented by the general formula I, and a method for the production of the novel prepolymer.

The carboxyl group-containing (meth)acrylate prepolymer of the present invention is obtained by causing a hydroxyl group-containing (meth)acrylate oligomer (A) represented by the general formula I to react with at least one compound (D) selected from the group consisting of carboxylic acids (D1) represented by the aforementioned general formula and carboxylic anhydrides (D2) optionally further with a hydroxyl group-containing organic compound (C) other than the hydroxyl group-containing (meth)acrylate oligomer (A).

The compound (D) to be used for this invention is one member selected from the group consisting of carboxylic acids (D1) represented by the aforementioned general formula and carboxylic anhydrides (D2). Typical examples of the compound (D) include maleic acid, malonic acid, succinic acid, dodecenylsuccinic acid, glutaric acid, citraconic acid, phthalic acid, tetrahydrophthalic acid, methyl tetrahydrophthalic acid, hexahydrophthalic acid, methylhexahydrophthalic acid, tetrachlorophthalic acid, tetrabromophthalic acid, 3,6-endomethylene-tetrahydrophthalic acid, chlorendic acid, trimellitic acid, pyromellitic acid, hemimellitic acid, methylcyclohexene tricarboxylic acid, and 4,4'-benzophenone tetracarboxylic acid, and anhydrides of these acids. One member or a mixture of two or more members selected from the group of acids and anhydrides enumerated above can be used effectively herein.

As the hydroxyl group-containing organic compound (C) to be used when necessary in this invention, any organic compound which is other than the hydroxyl group-containing (meth)acrylate oligomer (A) and which contains at least one hydroxyl group capable of reacting with the compound (D) can be adopted without being specifically limited. Typical examples of the hydroxyl group-containing organic compound (C) include aliphatic monohydric alcohols such as methanol and ethanol; alkylene glycol monoalkyl ethers such as ethylene glycol monomethyl ether; and partially esterified unsaturated acids such as hydroxyethyl (meth)acrylate, hydroxypropyl (meth)acrylate, 1,4-butane diol mono(meth)acrylate, and pentaerythritol acrylate. One member or a mixture of two or more members selected from the group of hydroxyl group-containing organic compounds just enumerated can be effectively used herein.

The method of this invention for the production of a carboxyl group-containing (meth)acrylate prepolymer can be embodied in any of the known procedures. To be specific, this prepolymer can be produced by the reaction of a hydroxyl group-containing (meth)acrylate oligomer (A) represented by the general formula I with a compound (D) or by the reaction of a hydroxyl group-containing (meth)acrylate oligomer (A) represented by the general formula I with a hydroxyl group-containing organic compound (C) and a compound (D). As the compound (D), a carboxylic anhydride (D2) can be used particularly advantageously because the reaction proceeds under mild conditions. The amounts in which these raw materials are added to the reaction vessel are selected properly in accordance with the particular species of carboxyl group-containing (meth)acrylate prepolymer desired to be obtained. When a carboxylic anhydride (D2) is used, the raw materials are generally added in amounts such that the number of hydroxyl groups per each acid anhydride group will fall in the range of 1.0 to 1.1. It is permissible to use the hydroxyl group-containing (meth)acrylate oligomer (A) in a large excess.

This reaction is desired to be carried out at a temperature in the range of 10° to 150° C., preferably 50° to 120° C. If the reaction temperature is higher, the vinyl group of the raw material and the vinyl group of the reaction product are more susceptible of polymerization. If the reaction temperature is too low, the solubility of the compound (D) in the reaction system is lower and the reaction velocity is proportionately lower. For the purpose of preventing the vinyl group of the raw materials and the vinyl group of the reaction product from polymerization, the reaction is desired to be carried out in the presence of a polymerization inhibitor. Typical examples of the polymerization inhibitor usable advantageously herein are equal to those already cited.

The amount of the polymerization inhibitor to be used herein generally falls in the range of 0.005 to 1% by weight based on the weight of the raw materials.

The present reaction can be carried out, for the purpose of promoting the reaction between the hydroxyl group and the carboxyl group or acid anhydride group in the compound (D), in the presence of any of the known catalyst such as, for example, tertiary amines like triethyl amine and quaternary ammonium salts like trimethylbenzyl ammonium chloride. The reaction may be carried out, when necessary, in a suitable solvent. The solvent is not specifically limited. Typical examples of the solvent usable advantageously herein include reactive solvents such as styrene, vinyl acetate, methyl (meth)acrylate, ethylene glycol di(meth)acrylate, 1,6-hexanediol di(meth)acrylate, neopentyl glycol di(meth)acrylate, polyethylene glycol di(meth)acrylate, trimethylol propane tri(meth)acrylate, pentaerythritol tetra(meth)acrylate, methoxyethyl (meth)acrylate, phenoxyethyl (meth)acrylate, and tetrahydrofurfuryl (meth)acrylate and aromatic hydrocarbons such as benzene, toluene, and xylene; ketones such as acetone, methylethyl ketone, methylisobutyl ketone, and cyclohexanone; esters such as methyl acetate, ethyl acetate, propyl acetate, and butyl acetate; ethers such as isopropyl ether, dioxane, and tetrahydrofuran; and halogenated hydrocarbons such as methylene chloride, chloroform, trichloroethylene, and ethylene dichloride.

The novel carboxyl group-containing (meth)acrylate prepolymer synthesized as described above may be polymerized to produce a (co)polymer possessing a carboxyl group or may be combined with ethylenically unsaturated compounds, various polymers (such as, for example, unsaturated polyester type, epoxy type, polyamide type, acrylic type, and polyvinyl alcohol type resins), organic solvents, fillers, tackifier, stabilizers, plasticizers, levelling agents, dyestuffs, and pigments to afford compositions possessing a carboxyl group-containing (meth)acrylate prepolymer represented by the general formula III as an essential component thereof. These compositions find extensive utility in coating materials, adhesive agents, inks, resins curable with ultraviolet light or electron ray, hard coats, resists, protective films for printed-circuit boards, sealing agents, binders, insulating varnishes, surface modifying agents, and dental cement. Further, the carboxyl group-containing (meth)acrylate prepolymer of the present invention may be subjected to addition reaction with such epoxy compounds as glycidyl (meth)acrylate, epichlorohydrin, butanediol diglycidyl ether, and bisphenol A diglycidyl ether and then polymerized to produce (co)polymers. Otherwise, the compositions so synthesized as to incorporate therein epoxy addition reaction products may be cured and put to extensive utility in coating materials, adhesive agents, particularly anaerobic adhesive agents, inks, and resins curable with ultraviolet light or electron ray. Further, the carboxyl group-containing (meth)acrylate prepolymer may be converted into metallic salts such as of sodium, potassium, calcium, and magnesium and used accordingly.

This invention further relates to a hydroxyl group-containing (meth)acrylate prepolymer, comprising reaction product of a hydroxyl group-containing compound (E) containing, as an essential component thereof, a hydroxyl group-containing (meth)acrylate oligomer (A) represented by the general formula I, with an oxygen-containing cyclic compound (F) and optionally with a carboxyl group-containing compound (G).

This invention also relates to a method for the production of a hydroxyl group-containing (meth)acrylate prepolymer, characterized by causing a hydroxyl group-containing compound (E) containing, as an essential component thereof, a hydroxyl group-containing (meth)acrylate oligomer (A) represented by the general formula I with an oxygen-containing cyclic compound (F) and optionally further with a carboxyl group-containing compound (G).

To be more precise, this invention relates to a novel hydroxyl group-containing (meth)acrylate prepolymer produced by the reaction of a compound containing a hydroxyl group and an unsaturated group with an oxygen-containing cyclic compound, characterized by using, as the compound containing a hydroxyl group and an unsaturated group, a specific hydroxyl group-containing (meth)acrylate oligomer (A) represented by the general formula I, and to a method for the production of the novel prepolymer.

The hydroxyl group-containing (meth)acrylate prepolymer of the present invention is obtained by causing a hydroxyl group-containing compound (E) containing, as an essential component thereof, a hydroxyl group-containing (meth)acrylate oligomer (A) represented by the general formula I to react with an oxygen-containing cyclic compound (F) and optionally further with a carboxyl group-containing compound (G).

As the hydroxyl group-containing compound (E), a hydroxyl group-containing (meth)acrylate oligomer (A) having part thereof substituted with other hydroxyl group-containing compound may be used. The hydroxyl group-containing compound which can be used as a substitute for part of the hydroxyl group-containing (meth)acrylate oligomer (A) to be used as the hydroxyl group-containing compound (E) is not specifically limited. Examples of the hydroxyl group-containing compound include aliphatic monohydric alcohols such as methanol and ethanol, alkylene glycol monoalkyl ethers such as ethylene glycol monomethyl ether; and partially esterified unsaturated acids such as hydroxyethyl (meth)acrylate, pentaerythritol triacrylate, polyethylene glycol mono(meth)acrylate, pentaerythritol triacrylate, polyethylene glycol mono(meth)acrylate, and ε-caprolactone-added mono(meth)acrylate. One member or a mixture or two or more members selected from the group of hydroxyl group-containing compounds enumerated above maybe used as added to the hydroxyl group-containing (meth)acrylate oligomer (A).

The oxygen-containing cyclic compounds (F) for use in the present invention embrace epoxy compounds (F1), lactones (F2), and tetrahydrofuran (F3). One member or a mixture of two or more members selected from the compounds enumerated above can be used advantageously.

The epoxy compounds (F1) comprises monofunctional epoxy compounds (F11) and polyfunctional epoxy compounds (F12). Typical examples of the monofunctional epoxy compound (F11) include alkylene oxides such as ethylene oxide and propylene oxide, alkenyl oxides such as butadiene monoxide; phenylalkylene oxides such as styrene oxide, monoglycidyl ether such as butyl glycidyl ether, allyl glycidyl ether, and phenyl glycidyl ether; epihalohydrins such as epichlorohydrin; and glycidyl esters such as glycidyl (meth)acrylate. Typical examples of the poly-functional epoxy compound (F12) include polyglycidyl ethers of aliphatic polyols such as ethylene glycol diglycidyl ether, propylene glycol diglycidyl ether, butylene glycol diglycidyl ether, glycerol triglycidyl ether, trimethylol propane triglycidyl ether, pentaerythritol tetraglycidyl ether, polyoxyethylene glycol diglycidyl ether, polyoxypropylene glycol diglycidyl ether, diglycerol tetraglycidyl ether, and dipentaerythritol hexaglycidyl ether; polyglycidyl ethers of alicyclic polyols such as 1,4-cyclohexylene glycol diglycidyl ether, hydrated bisphenol A diglycidyl ether, and bis(4-hydroxycyclohexyl)methane diglycidyl ether; polyglycidyl ethers of aromatic polyols such as bisphenol A, bisphenol F, novolak type phenol resin, resol type phenol resin, hydroquinone, resorcin, tetraphenyl ethane, bisphenol sulfone, polyglycidyl ether of bisphenol A-propylene oxide adduct, and the so-called bisphenol A type epoxy resin which is the reaction product of bisphenol A with epichlorohydrin; polyglycidyl esters of aliphatic polycarboxylic acids such as dimer acid diglycidyl esters; polyglycidyl esters of alicyclic polycarboxylic acids such as diglycidyl esters of cyclohexene dicarboxylic acids; polyglycidyl esters of aromatic polycarboxylic acids such as polyglycidyl esters of phthalic acid, isophthalic acid, and terephthalic acid; epoxy carboxylates such as epoxy cyclohexylmethyl epoxycyclohexane carboxylate; polyepoxides of unsaturated compounds such as butadiene diepoxide, vinyl cyclohexene diepoxide, and dicyclopentane diene diepoxide; glycidyl amines such as tetraglycidyl methaxylene diamine, tetraglycidyl 1,3-bisaminomethyl cyclohexane, and triglycidyl-p-aminophenol; polyglycidyl ethers of halogenated polyols such as tetrabromo-bis-phenol A; spiroglycol diglycidyl ether; and triglycidyl isocyanurate. Typical examples of lactones (F2) include δ-valerolactones such as δ-valerolactone and methyl-δ-valerolactone and ε-caprolactones such as ε-caprolactone and methyl-ε-caprolactone.

As typical examples of the carboxyl group-containing compound (G) to be optionally used in the present invention, carboxylic acids such as acrylic acid and methacrylic acid and the so-called partial esters which are adducts of hydroxyethyl (meth)acrylate to such polybasic acids as phthalic anhydride, maleic anhydride, and succinic anhydride can be cited.

Production of the hydroxyl group-containing (meth)acrylate prepolymer of the present invention can be attained by any of the known methods. For example, the production is effected by the reaction of an oxygen-containing cyclic compound (F) with a hydroxyl group-containing (meth)acrylate oligomer (A) alone or with a hydroxyl group-containing compound (E) admixed with other hydroxyl group-containing compound or by the reaction of a hydroxyl group-containing compound (E) with an oxygen-containing cyclic compound (F) and a carboxylic group-containing compound (G).

The amounts in which these raw materials are added to the reaction vessel be suitably selected in accordance with the particular species of hydroxyl group-containing (meth)acrylate prepolymer desired to be obtained. When the oxygen-containing cyclic compound (F) to be used is selected from among monofunctional epoxy compounds (F11), lactones (F2), and tetrahydrofuran (F3), generally the oxygen-containing cyclic compound (F) may be added in an amount falling in the range of 0.4 to 60, preferably 0.8 to 10, equivalent weight per each hydroxyl group of the hydroxyl group-containing compound (E). When a polyfunctional epoxy compound (F12) is used as the oxygen-containing cyclic compound (F), generally this oxygen-containing cyclic compound (F) may be added in an amount falling in the range of 0.6 to 2.5, preferably 0.8 to 2, equivalent weight per each hydroxyl group of the hydroxyl group-containing compound (E).

This reaction is desired to be carried out at a temperature in the range of $-10°$ to $150°$ C., preferably $10°$ to $120°$ C. If the reaction temperature is higher, the vinyl group of the raw materials and the vinyl group of the reaction product are more liable to undergo polymerization. If the reaction temperature is excessively low, the reaction velocity is smaller than tolerable. The reaction is not always required to be carried out at a fixed temperature. It may be different in the first half and the last half respectively of the whole reaction period. For the purpose of precluding the polymerization of the vinyl group of the raw material and the vinyl group of the reaction product, the reaction is desired to be carried out in the presence of a polymerization inhibitor. Examples of the polymerization inhibitor are the same which have already been cited. The amount of the polymerization inhibitor to be used generally falls in the same range of 0.005 to 1% by weight based on the amount of the raw materials.

For the purpose of promoting the reaction of the hydroxyl group with the oxygen-containing cyclic compound (F), this reaction may be carried out in the presence of any of the known catalysts such as basic catalysts like triethyl amine and acid catalysts like Lewis acids.

The reaction may be carried out, when necessary, in a suitable solvent. The solvent so used is not specifically limited. Examples of the solvent usable effectively herein include reactive solvents such as styrene, vinyl acetate, methyl (meth)acrylate, ethylene glycol di(meth)acrylate, 1,6-hexanediol di(meth)acrylate, neopentyl glycol di(meth)acrylate, polyethylene glycol di(meth)acrylate, trimethylol propane tri(meth)acrylate, pentaerythritol tetra(meth)acrylate, methoxyethyl (meth)acrylate, phenoxyethyl (meth)acrylate, and tetrahydrofurfuryl (meth)acrylate and aromatic hydrocarbons such as benzene, toluene, and xylene; ketones such as acetone, methylethyl ketone, methylisobutyl ketone, and cyclohexanone; esters such as methyl acetate, ethyl acetate, propyl acetate, and butyl acetate; ethers such as isopropyl ether, dioxane, and tetrahydrofuran; and halogenated hydrocarbons such as methylene chloride, chloroform, trichloroethylene, and ethylene dichloride.

The novel hydroxyl group-containing (meth)acrylate prepolymer synthesized as described above may be polymerized to produce a (co)polymer containing a hydroxyl group or may be combined with ethylenically unsaturated compounds, various polymers (such as, for example, unsaturated polyester type, epoxy type, polyamide type, acryl type, and polyvinyl alcohol type resins), organic solvents, fillers, tackifier, stabilizers, plasticizers, levelling agents, dyestuffs, and pigments to produce compositions containing a hydroxy group-containing (meth)acrylate prepolymer as an essential component thereof. These compositions find extensive utility in coating materials, adhesive agents, inks, resins curable with ultraviolet light or electron ray, hard coats, resists, protective films for printed-circuit boards, sealing agents, binders, insulating varnishes, and surface modifying agents. Further, the hydroxyl group-containing (meth)acrylate prepolymer of the present invention may be covered, through reaction with isocyanate group-containing compounds such as 1,6-hexamethylene diisocyanate, isophorone diisocyanate, and tolylene diisocyanate, into prepolymers containing an urethane bond and then polymerized to produce (co)polymers. The compositions containing prepolymers possessed of a urethane bond may be cured and utilized extensively in coating materials, adhesive agents, inks, and resins curable with ultraviolet light or electron ray.

The hydroxyl group-containing (meth)acrylate oligomer represented by the general formula I obtained by this invention and the various prepolymers produced from the oligomer can be converted into polymers or copolymers as described above. These polymers or copolymers find extensive utility in coating materials, adhesive agents, inks, textile modifying agents, resins curable with ultraviolet light or electron ray, protective films for printed-circuit boards, inorganic pigment dispersants, anti-scale agents, hard coats, resists, sealing agents, insulating varnishes, and surface modifying agents.

Now, concrete applications in which the oligomers and the prepolymers of the present invention find utility will be described below.

The hydroxyl group-containing (meth)acrylate oligomer, urethane (meth)acrylate prepolymers, carboxylic group-containing (meth)acrylate prepolymers, and hydroxyl group-containing (meth)acrylate prepolymers obtained by the present invention may be independently polymerized or combined with ethylenically unsaturated compounds and various polymers (such as, for example, unsaturated polyester type, epoxy type, polyamide type, acryl type, and polyvinyl alcohol type resins), organic solvents, stabilizers, plasticizers, levelling agents, dyestuffs, and pigments to produce compositions.

Typical examples of the ethylenically unsaturated compound usable for the preparation of the compositions include styrene, α-methyl styrene, acrylonitrile, (meth)acrylamide, diacetone acrylamide, N-methyl (meth)acrylamide, N-methyl (meth)acrylamide, N-methylol (meth)acrylamide, N-vinyl pyrrolidone, diallyl phthalate, allyl glycidyl ether, (meth)acrylic acid, alkyl (meth)acrylates such as methyl (meth)acrylate, tetrahydro furfuryl (meth)acrylate, methoxyethyl (meth)acrylate, phenoxyethyl (meth)acrylate, dibromopropyl (meth)acrylate, 2-hydroxyethyl (meth)acrylate, 2-hydroxypropyl (meth)acrylate, ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, 1,6-hexanediol di(meth)acrylate, neopentyl glycol di(meth)acrylate, trimethylol propane tri(meth)acrylate, pentaerythritol tri(meth)acrylate, pentaerythritol tetra(meth)acrylate, dipentaerythritol penta(meth)acrylate, dipentaerythritol hexa(meth)acrylate, tris-hydroxyethylisocyanurate tri(meth)acrylate, ethylene oxide-added bisphenol A di(meth)acrylate, hydrogenated bisphenol A di(meth)acrylate, polyester (meth)acrylates obtained by the reaction of (meth)acrylic acid with glycols and polybasic acids, epoxy (meth)acrylates obtained by the reaction of (meth)acrylic acid with epoxy compounds, urethane (meth)acrylates obtained by the reaction of isocyanate group-containing compounds with hydroxyalkyl (meth)acrylates, carboxyl group-containing (meth)acrylates obtained by the reaction of carboxylic anhydrides with hydroxyalkyl (meth)acrylate, dimethylaminoethyl (meth)acrylate, diethylaminoethyl (meth)acrylate, dicyclopentenyl (meth)acrylate, dicyclopentenyloxyethyl (meth)acrylate, silicone (meth)acrylate, amide (meth)acrylate, and phosphoric acid (meth)acrylate. One member or a mixture of two or more members selected from the ethylenically unsaturated compounds enumerated above can be used effectively herein. In the ethylenically unsaturated compounds, those of relatively low levels of viscosity are sometimes called as reactive diluents.

When the resin or ethylenically unsaturated compound is used for the purpose of this invention, the amount thereof to be added is not specifically limited. It can be suitably fixed so as to suit the viscosity or curing property required to be possessed by the produced resin composition or the physical properties of the cured product.

The compositions can be applied to given substrates or molded in desired shapes by any of the known methods. They can be cured by virtue of heat or radiation, for example. In thermosetting such compositions, there can be used any of the conventional radical polymerization initiators such as, for example, benzoyl peroxide, methylethyl ketone peroxide, lauroyl peroxide, cyclohexanone peroxide, t-butyl hydroperoxide, di-t-butyl peroxide, di-t-amyl peroxide, dicumyl peroxide, t-butyl perbenzoate, and azobis isobutyronitrile. The radical polymerization initiator may be used, when necessary, in combination with any of the known radical polymerization accelerators such as, for example, organic metal salts like cobalt octenate, cobalt naphthenate, iron octenate, manganese octenate, and vanadium octenate, and organic amines like N,N-dimethyl aniline. In curing the compositions by radiation, electron ray, ultraviolet light, etc. can be used. When the curing is effected with ultraviolet light, the composition under treatment is admixed with a conventional photo initiator, when necessary, in combination with a sensitizer, each added in a concentration in the range of 0.1 to 10% by weight based on the amount of the composition. As typical examples of the photo initiator, there may be cited benzoin; benzoin alkyl ethers such as benzoin isopropylether and benzoin isobutyl ethers; benzophenones such as benzophenone, Michler's ketone, and methyl-o-benzoyl benzoate; acetophenones such as acetophenone, trichloroacetophenone, 2,2-diethoxyacetophenone, p-t-butyl trichloroacetophenone, 2,2-dimethoxy-2-phenylacetophenone, and p-dimethylaminoacetophenone; xanthone; thioxanthones such as this xanthone, 2-chlorothioxanthone, and 2-isopropyl thioxanthone; and benzil, 2-ethyl anthraquinone, methyl-benzoyl formate, 2-hydroxy-2-methyl-1-phenyl propan-1-one, 2-hydroxy-4'-isopropyl-2-methyl propiophenone, 1-hydroxycyclohexyl phenylketone, tetramethyl thiuram monosulfide, and allyl diazonium salt. Examples of the sensitizer are amine compounds, sulfur compounds, and phosphorus compounds. They can be used either independently or as mixtures of two or more members. The curing by means of ultraviolet light and that by means of heat may be jointly performed. Otherwise, the curing by means of electron ray and that by means of heat may be jointly carried out.

These compositions excel in curing property and adhesiveness to substrates. The cured products of these compositions are excellent in hardness and other properties. They find extensive utility in coating materials, adhesive agents, inks, hard coats, resists, protective films for printed-circuit boards, sealing agents, binders, insulating varnishes, and overprint varnishes.

Further, the hydroxyl group-containing (meth)acrylate oligomers represented by the general formula I obtained by this invention and the various prepolymers produced from the oligomers may be independently polymerized to produce (co)polymers.

The ethylenically unsaturated compounds which are usable for the production of such copolymers are the same which are usable for the preparation of the compositions.

The production of such a (co)polymer can be carried out by any of various known methods such as, for example, bulk polymerization, solution polymerization, suspension polymerization, and emulsion polymerization. For copolymerization, hydroxyl group-containing (meth)acrylate oligomers and various prepolymers derived therefrom may be jointly subjected to polymerization. Otherwise, they may be subjected to multi-stage polymerization or graft or block polymerization. Further, they may be polymerized as deposited on films, textiles, and cast products.

The various methods of polymerization mentioned above can be initiated by the use of an initiator, by the application of heat, or the exposure to ultraviolet light or electron ray.

The initiators which are usable for the polymerization embrace persulfates such as ammonium persulfate, peroxides such as benzoyl peroxide, azo compounds such as azobisisobutyronitrile, and redox type initiators formed by the reaction of hydrogen peroxide with iron salts.

In any of the various methods of polymerization, an organic solvent such as toluene, xylene, acetone, methyl isobutyl ketone, methanol, ethanol, isopropanol, ethyl acetate, dimethyl formamide, dimethyl sulfoxide, or methylene chloride, water, a mixed solvent comprising water and a water-soluble organic solvent, a polymerization regulator such as dodecyl mercaptan, a dispersant such as partially saponified polyvinyl alcohol, or an emulsifier such as dodecylbenzene sodium sulfonate or polyoxyethylenealkylphenyl ether may be used as occasion demands.

In the various methods of polymerization mentioned above, the polymerization temperature is variable with the particular method of polymerization used, the kind of ethylenically unsaturated compound to be copolymerized, etc. Generally, the temperature falls in the range of from $-10°$ C. to $200°$ C.

The copolymers so produced find extensive utility in coating agents, adhesive agents, adhesive mass, textile modifying agents, surface modifying agents, inorganic pigment dispersants, and antiscale agents.

Now, the present invention will be described below with reference to working examples. It should be noted that this invention is not limited by these examples. The analysis of reaction products and the determination of their chemical structures were carried out by IR, H—NMR, $^{13}$C—NMR, and GPC (gel permeation chromatography) (eluent: THF). Wherever parts are mentioned, they are meant as parts by weight.

EXAMPLE 1

A reaction vessel provided with a thermometer and a stirrer was charged with 232 parts of 2-hydroxyethyl acrylate, 0.07 part of hydroquinone monomethyl ether as a polymerization inhibitor, and 2.3 parts of 12-tungstophosphoric acid as a catalyst and then ketp at 80° C. for 7.5 hours. After completion of the reaction, the reaction mixture and 12 parts of powdered magnesium silicate added thereto as an adsorbent were stirred at 40° C. for 30 minutes. The resultant mixture was purified by being filtered under pressure. Consequently, there was obtained 228 parts (98.3% of yield) of a clear, colorless liquid reaction product of color number 10 (APHA). This product was found, by NMR analysis, to contain the acryloyl group and the hydroxyl group in equivalent amounts and, by GPC, to have an average molecular weight of 401. The IR, NMR, and GPC analyses identify this reaction product as a hydroxyl group-containing acrylate oligomer of the following structure (hereinafter referred to as "hydroxyl group-containing acrylate oligomer (1)").

Figure 2:
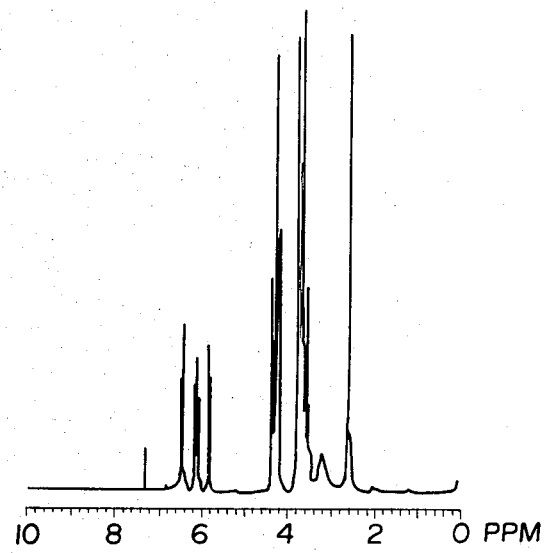
FIG. 2 is an H-NMR spectrum diagram of a typical hydroxyl group-containing (meth)acrylate oligomer according with this invention.
Figure 3:
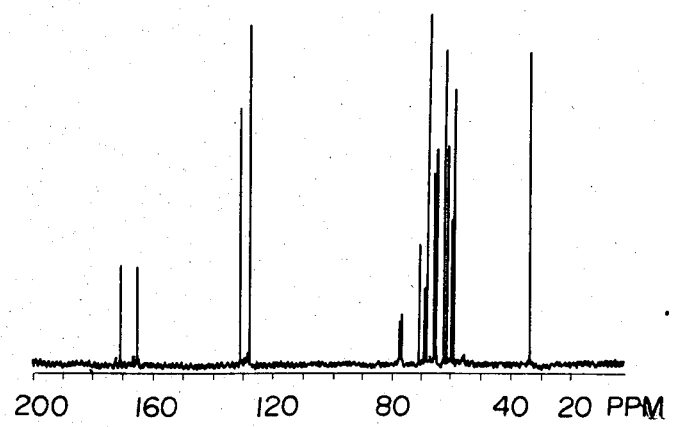
FIG. 3 is a $^{13}$C-NMR spectrum diagram of a typical hydroxyl group-containing (meth)acrylate oligimer according with this invention.

The infrared absorption spectrum of the reaction product is shown in FIG. 1, the H—NMR spectrum thereof in FIG. 2, and the $^{13}$C—NMR spectrum thereof in FIG. 3.

EXAMPLE 2

The same reaction vessel as used in Example 1 was charged with 260 parts of 2-hydroxypropyl acrylate, 0.08 part of hydroquinone monomethyl ether as a polymerization inhibitor, and 2.6 parts of 12-tungstophosphoric acid as a catalyst and then kept at 100° C. for four hours. After completion of the reaction, the reaction mixture and 13 parts of powdered magnesium silicate added thereto as an adsorbent were stirred at 40° C. for 30 minutes. The resultant mixture was purified by being filtered under pressure. Consequently, there was obtained 253 parts (97.3% of yield) of a colorless, transparent liquid reaction product of color number 10 (APHA). This product was found, by NMR analysis, to contain the acryloyl group and the hydroxyl group in equivalent weights and, by GPC, to have an average molecular weight of 378. The IR, NMR, and GPC analyses identify this reaction product as a hydroxyl group-containing acrylate oligomer of the following structure (hereinafter referred to as "hydroxyl group-containing acrylate oligomer (2)").

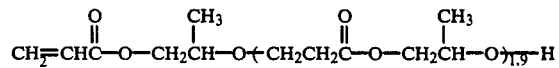

Figure 4:
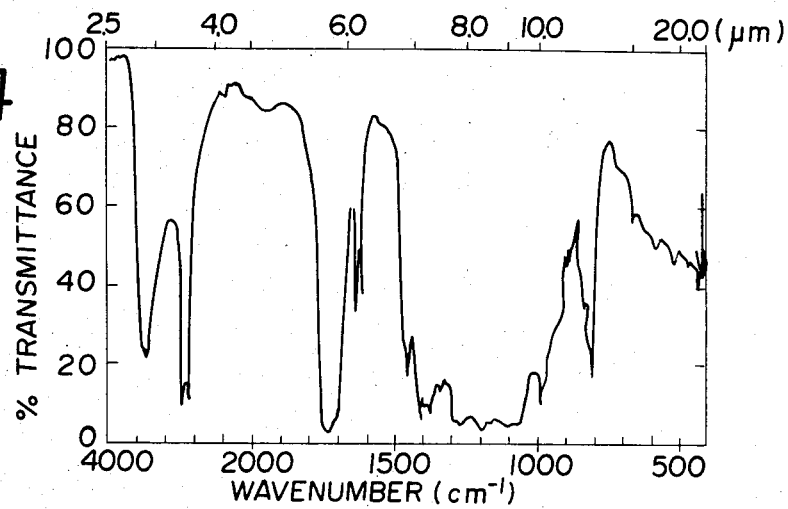
FIGS. 4 and 5 are IR spectrum diagrams of other hydroxyl group-containing (meth)acrylate oligomers according with this invention.

The infrared absorption spectrum of the reaction product is shown in FIG. 4.

EXAMPLE 3

The same reaction vessel as used in Example 1 was charged with 260 parts of 2-hydroxypropyl acrylate, 0.08 part of hydroquinone monomethyl ether as a polymerization inhibitor, and 2.6 parts of 12-tungstosilicic acid as a catalyst and then kept at 100° C. for five hours. After completion of the reaction, the reaction mixture and 13 parts of powdered basic magnesium aluminum hydroxycarbonate hydrate added thereto as an absorbent were stirred at 60° C. for 30 minutes. The resultant mixture was purified by filtration under pressure. Consequently, there was obtained 251 parts (96.5% of yield) of a clear, colorless liquid reaction product. This reaction product was found to be a hydroxyl group-containing acrylate oligomer of the following structure having an average molecular weight of 510 (hereinafter referred to as "hydroxyl group-containing acrylate oligomer (3)").

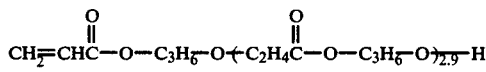

EXAMPLES 4–11

Hydroxyl group-containing carylate oligomers were obtained by following the procedure of Example 1, except that the raw materials and the reaction conditions were changed as shown in Table 1. The yields and properties of the reaction products (hereinafter referred to respectively as "hydroxyl group-containing acrylate oligomers (4)–(11)") are shown in Table 1.

EXAMPLE 12

The same reaction vessel as used in Example 1 was charged with 260 parts of 2-hydroxyethyl methacrylate, 0.13 part of hydroquinone monomethyl ether as a polymerization inhibitor, and 2.6 parts of tungstophosphoric acid as a catalyst and then kept at 100° C. for four hours. After completion of the reaction, the reaction mixture and 260 parts of water added thereto were stirred at room temperature and then left standing at rest. From the resultant system, the water layer (upper layer) was removed. The residual liquid was left standing at 80° C. for 30 minutes under a vacuum of 3 mmHg to expel water and the remaining unaltered raw materials. Consequently, there was obtained 102 parts (39.2% of yield) of a colorless, transparent liquid reaction product of color number 10 (APHA). The reaction product, on analysis by IR, NMR, and GPC, was found to contain the methacryloyl group and the hydroxyl group in equivalent amounts and was identified as a hydroxyl group-containing methacrylate oligomer of the following structure having an average molecular weight of 297 (hereinafter referred to as "hydroxyl group-containing methacrylate oligomer (12)").

Figure 5:
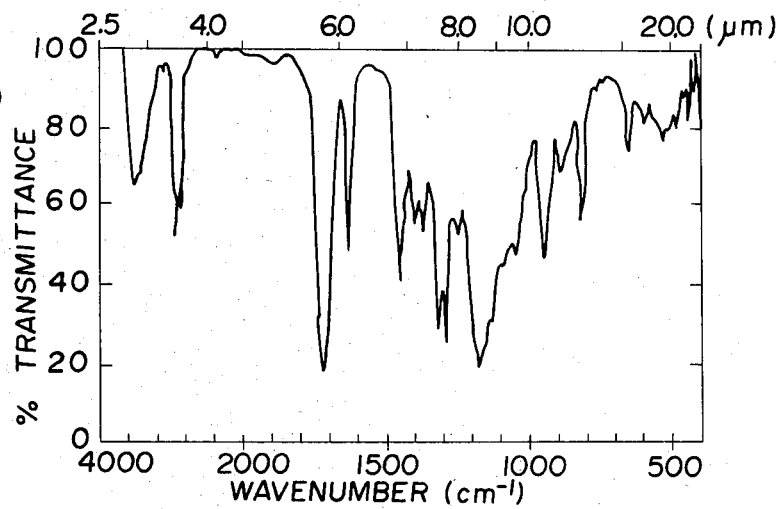

The infrared absorption spectrum of this oligomer is shown in FIG. 5.

EXAMPLE 3

The procedure of Example 1 was repeated, except that diethylene glycol monoacrylate was used in the place of 2-hydroxyethyl acrylate, to afford 227 parts of a reaction product (97.8% of yield). The reaction product, by NMR, was found to contain the acryloyl group and the hydroxyl group in equivalent amounts and, on analysis by IR, NMR, and GPC, was identified as a hydroxyl group-containing acrylate oligomer of the followng structure having an average molecular weight of 414.

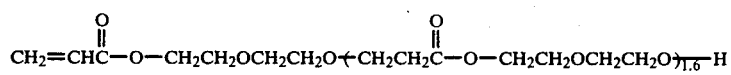

EXAMPLE 14

The procedure of Example 1 was repeated, except that 58 parts of 2-hydroxyethyl acrylate and 65 parts of 2-hydroxypropyl acrylate were used in the place of 232 parts of 2-hydroxyethyl acrylate, to afford 120 parts (97.6% in yield) of a reaction product. The reaction product, on analysis by NMR, was found to contain the acryloyl group and the hydroxyl group in equivalent amounts and, on analysis by IR, NMR, and GPC, was identified as an oligomer of 2-hydroxyethyl acrylate and 2-hydroxypropyl acrylate.

EXAMPLE 15

A reaction vessel provided with a thermometer, a dropping funnel, a reflux tube, and a stirrer was charged with 201 parts (0.5 equivalent weight) of the hydroxyl group-containing acrylate oligomer (1) obtained in Example 1, 0.025 parts of hydroquinone monomethyl ether as a polymerization inhibitor, and 0.13 part of dibutyl tin dilaurate as a urethanation catalyst. Then, to the content of the reaction vessel kept stirred, 53 parts (0.5 equivalent weight) of trimethylhexamethylene diisocyanate (product of Hüls AG) was added dropwise over a period of one hour, with the reaction vessel kept cooled to prevent the temperature thereof from rising beyond 60° C. The resultant mixture was kept at 60° to 65° C. for four hours to afford 254 parts of a reaction proudct (hereinafter referred to as "urethane acrylate prepolymer (1)"). On the basis of its free isocyanate group content (not more than 0.1%) and its infrared absorption spectrum, this reaction product is identified as a urethane acrylate prepolymer of the following structure.

wherein $C_9H_{18}$ denotes a residue of trimethylhexamethylene diisocyanate.

Figure 6:
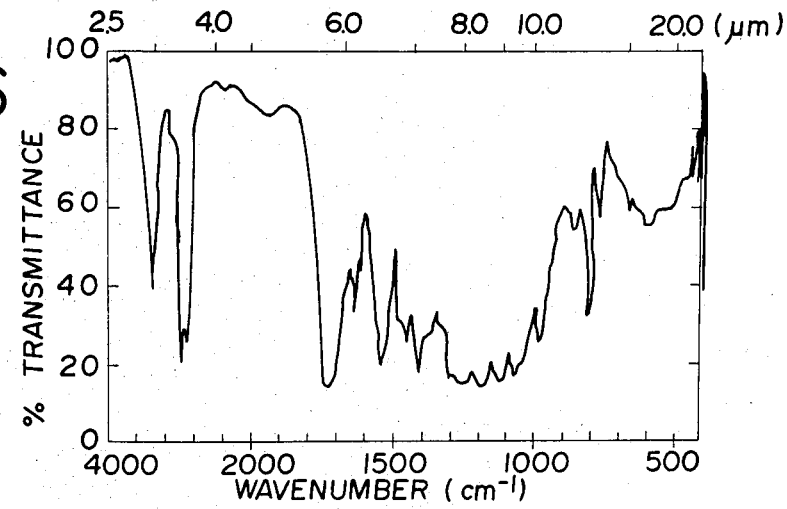
FIGS. 6–16 are IR spectrum diagrams of hydroxyl group-containing (meth)acrylate prepolymers according with this invention.

The infrared absorption spectrum of the reaction product is shown in FIG. 6.

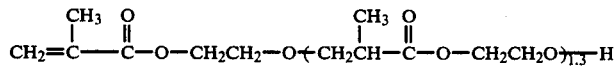

EXAMPLE 16

The same reaction vessel as used in Example 15 was charged with 201 parts (0.5 equivalent weight) of the hydroxyl group-containing acrylate oligomer (1) obtained in Example 1, 0.029 part of hydroquinone monomethyl ether as a polymerization inhibitor, and 0.14 part of dibutyl tin dilaurate as a urethanation catalyst. Then, to the content of the reaction vessel kept stirred, 87 parts (1 equivalent weight) of 2,4-tolylene diisocyanate was added dropwise over a period of two hours, with the reaction vessel kept cooled to prevent the temperature thereof from rising beyond 60° C. The resultant mixture was kept at 60° to 65° C. for four hours to afford 288 parts of a reaction product (hereinafter referred to as "urethane acrylate prepolymer (2)"). On the basis of its free isocyanate group content (7.2%) and its infrared absorption spectrum, the reaction product was identified as urethane acrylate prepolymer of the following structure.

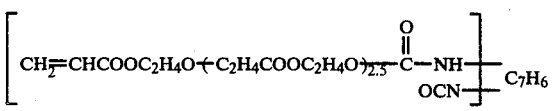

wherein $C_7H_6$ denotes a residue of 2,4-tolylene diisocyanate.

Figure 7:
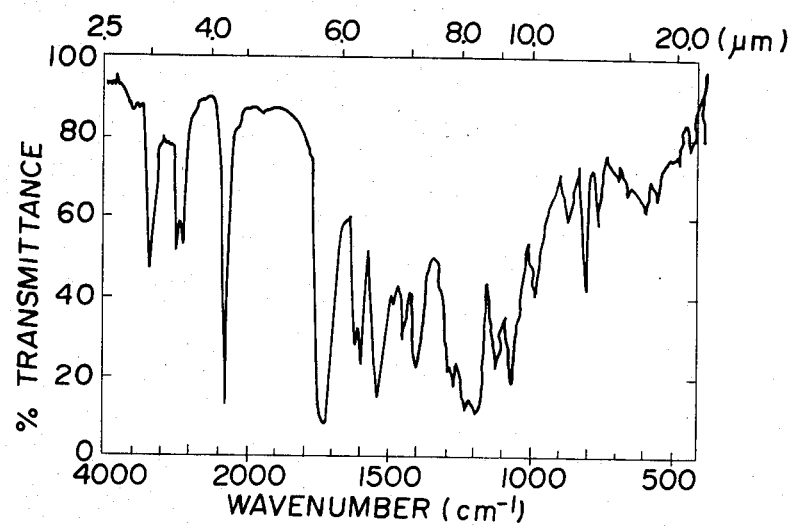

The infrared absorption spectrum of this reaction product is shown in FIG. 7.

EXAMPLE 17

The same reaction vessel as used in Example 15 was charged with 288 parts of the urethane acrylate prepolymer (2) obtained in Example 16. Then, to the content of the reaction vessel kept stirred, 58 parts of (0.5 equivalent weight) of 2-hydroxyethyl acrylate was added dropwise over a period of two hours, with the reaction vessel kept cooled to prevent the temperature thereof from rising beyond 60° C. The resultant mixture was kept at 60° to 65° C. for four hours to afford 346 parts of a reaction product (hereinafter referred to as "urethane acrylate prepolymer (3)"). On the basis of its free isocyanate group content (not more than 0.1%) and its infrared absorption spectrum, this reaction product is identified as a urethane acrylate prepolymer of the following structure.

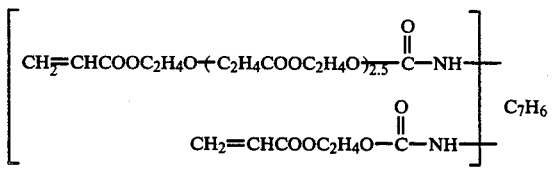

wherein $C_7H_6$ denotes a residue of 2,4-tolylene diisocyanate.

Figure 8:
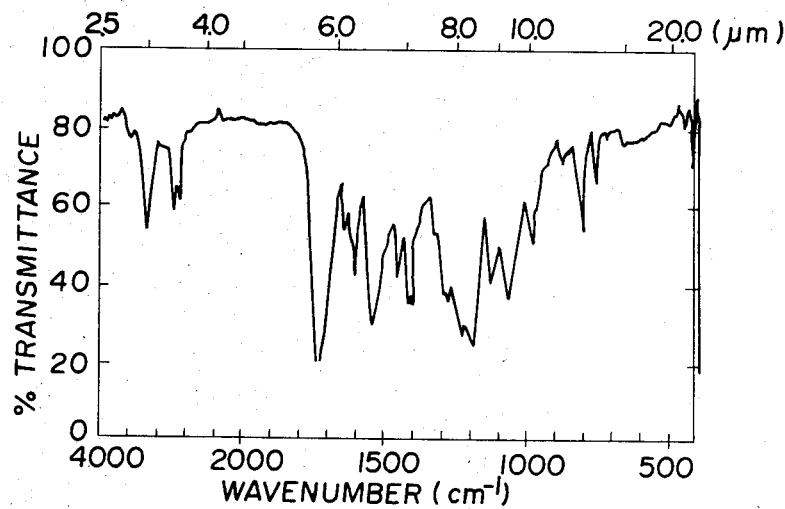

The infrared absorption spectrum of the reaction product is shown in FIG. 8.

EXAMPLE 18

Figure 9:
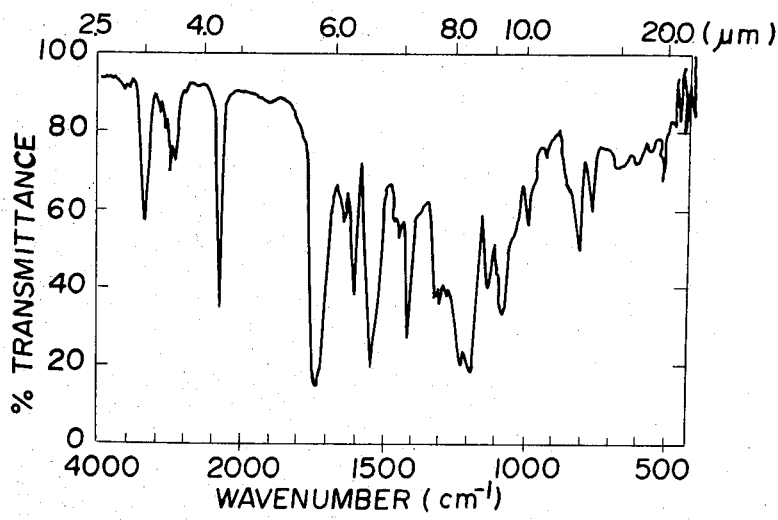

The same reaction vessel as used in Example 15 was charged with 122 parts (0.9 equivalent weight) of polymethylene polyphenyl isocyanate (produced by Nippon Polyurethane Industry Co., Ltd. and marketed under trademark designation of "Millionate MR-100"). Then, to the content of the reaction vessel kept stirred, a mixture containing 120 parts (0.3 equivalent weight) of the hydroxyl group-containing acrylate oligomer (1) obtained in Example 1, 0.14 part of hydroquinone monomethyl ether as a polymerization inhibitor, and 0.14 part of dibutyl tin dilaurate as a urethanation catalyst was added dropwise over a period of one hour at 65° C. The resultant mixture was kept at 60° to 65° C. for one hours. Then, 35 parts (0.3 equivalent weight) of 2-hydroxyethyl acrylate was added dropwise thereto at 65° C. over one hour. The resultant mixture was further kept at 60° to 65° C. for two hours to afford 277 parts of a reaction product (hereinafter referred to as "urethane acrylate prepolymer (4)"). The free isocyanate group content of this reaction product was 4.5%. The infrared absorption spectrum of this reaction product is shown in FIG. 9.

EXAMPLES 19-25

Figure 10:
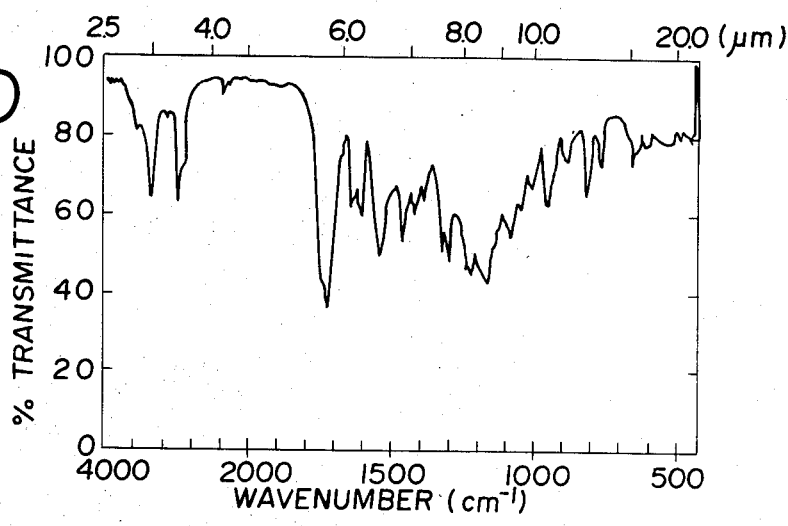

Urethane (meth)acrylate prepolymers (5) through (11) were obtained by following the procedure of Example 15, except that the raw materials shown in Table 2 were used instead. The infrared absorption spectrum of the urethane methacrylate prepolymer (9) is shown in FIG. 10.

Control 1

The same reaction vessel as used in Example 15 was charged with 116 parts (1 equivalent weight) of 2-hydroxyethyl acrylate, 0.029 part of hydroquinone monomethyl ether as a polymerization inhibitor, and 0.14 part of dibutyl tin dilaurate as a urethanation catalyst. Then, to the content of the reaction vessel kept stirred, 87 parts (1 equivalent weight) of 2,4-tolylene diisocyanate was added dropwise over a period of two hours, with the reaction vessel kept cooled to prevent the temperature thereof from rising beyond 60° C. The resultant mixture was kept at 60° to 65° C. for eight hours to afford 203 parts of a reaction product (hereinafter referred to as "comparative urethane acrylate prepolymer (1)"). The free isocyanate group content of this reaction product was not more than 0.1%.

The viscosity (measured at 25° C. with a viscosimeter, type B) of the urethane acrylate prepolymer (3) obtained in Example 17 and that of the comparative urethane acrylate prepolymer (1) obtained in Control 1 are shown below. Comparison of the data reveals that the urethane (meth)acrylate prepolymer of the present invention has lower viscosity and excels in viscosity characteristics.

| | Viscosity (25° C.) |
|---|---|
| Urethane acrylate prepolymer (3) of Example 17 | 6200 cps |
| Comparative urethane acrylate prepolymer (1) of Control 1 | Solid |

EXAMPLE 26

A reaction vessel provided with a thermometer, a reflux tube, and a stirrer was charged with 401 parts (1 equivalent weight) of the hydroxyl group-containing acrylate oligomer (1) obtained in Example 1 and 98 parts (1 mol) of maleic anhydride as raw materials, 0.25 part of hydroquinone monomethyl ether as a polymerization inhibitor, and 2.5 parts of trimethylbenzyl ammonium chloride as a catalyst and then kept at 70° C. for six hours. Consequently, there was obtained 501 parts of a reaction product (hereinafter referred to as "carboxyl group-containing acrylate prepolymer (1)"). On the basis of its infrared absorption spectrum and its acid number 108, this reaction product is identified as a carboxyl group-containing acrylate prepolymer of the following structure.

Figure 11:
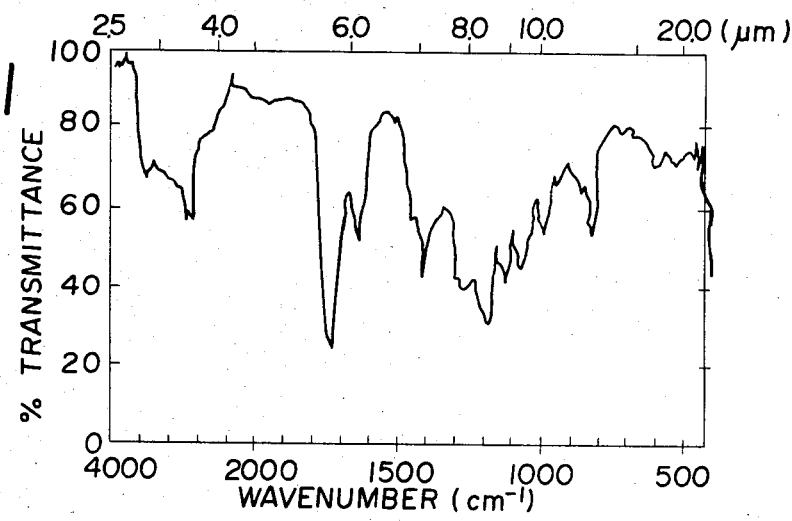

The infrared absorption spectrum of this reaction product is shown in FIG. 11.

EXAMPLE 27

The same reaction vessel as used in Example 26 was charged with 401 parts (1 equivalent weight) of the hydroxyl group-containing acrylate oligomer (1) obtained in Example 1, 109 parts (0.5 mol) of pyromellitic anhydride, 0.51 part of hydroquinone monomethyl ether as a polymerization inhibitor, and 2.6 parts of trimethylbenzyl ammonium chloride as a catalyst and kept at 60° C. for seven hours. Consequently, there was obtained 513 parts of a reaction product (hereinafter referred to as "carboxyl group-containing acrylate prepolymer (2)"). On the basis of its infrared absorption spectrum and its acid number 106, this reaction product is identified as a carboxyl group-containing acrylate prepolymer of the following structure.

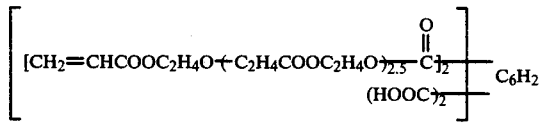

wherein $C_6H_2$ denotes a residue of pyromellitic anhydride.

Figure 12:
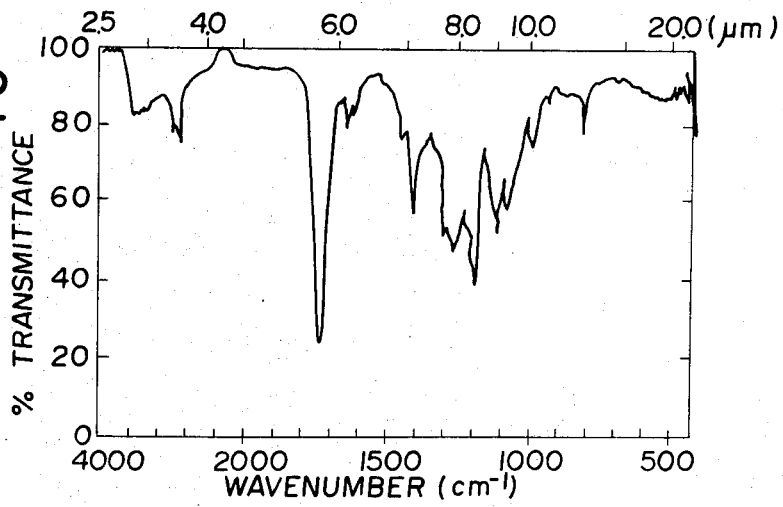

The infrared absorption spectrum of the reaction product is shown in FIG. 12.

EXAMPLE 28-32

Carboxyl group-containing (meth)acrylate prepolymer (3) through (7) were obtained as reaction products by following the procedure of Example 26, except that the raw materials shown in Table 3 were used instead.

EXAMPLE 33

The same reaction vessel as used in Example 26 was charged with 201 parts (0.5 equivalent weight) of the hydroxyl group-containing acrylate oligomer (1) obtained in Example 1, 96 parts (0.5 mol) of trimellitic anhydride, 90 parts of 1,6-hexanediol diacrylate as a diluent, 0.15 part of hydroquinone monomethyl ether as a polymerization inhibitor, and 0.9 part of trimethylbenzyl ammonium chloride as a catalyst and then kept at 80° C. for four hours. Consequently, there was obtained 388 parts of a reaction product (hereinafter referred to as "carboxyl group-containing acrylate prepolymer (8)"). On the basis of its infrared absorption spectrum and its acid number 141, this reaction product is identified as a carboxyl group-containing acrylate prepolymer of the following structure.

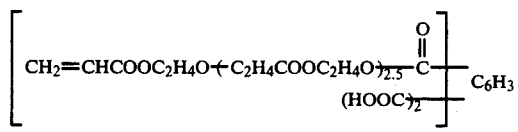

wherein $C_6H_3$ denotes a residue of trimellitic anhydride.

EXAMPLE 34

A reaction vessel provided with a thermometer, a reflux tube, and a stirrer was charged with 190 parts (1 equivalent weight) of bis-phenol A type epoxy resin (a product of epoxy equivalent 190 marketed by Yuka Shell Epoxy Co., Ltd. under trademark designation of "Epikote 828"), 3 parts of dimethylaminoethyl methacrylate as a catalyst, and 0.6 part of hydroquinone monometyl ether as a polymerization inhibitor. Then, to the content of the reaction vessel kept stirred at 100° C., 401 parts (1 equivalent weight) of the hydroxyl group-containing acrylate oligomer (1) obtained in Example 1 was added dropwise over a period of two hours. The resultant mixture was kept at the same temperature for five hours to continue the reaction. Consequently, there was obtained 595 parts of a reaction product of hydroxyl number 96.4 (hereinafter referred to as "hydroxyl group-containing acrylate prepolymer (1)"). When this reaction product was analyzed by gel permeation chromatography (GPC), it was found to contain no discernible unaltered bis-phenol A type epoxy resin. On the basis of its hydroxyl number and its infrared absorption spectrum, this reaction product is identified as a hydroxyl group-containing acrylate prepolymer of the following structure.

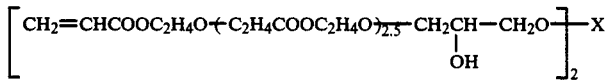

wherein X denotes a residue of bis-phenol A type epoxy resin.

Figure 13:
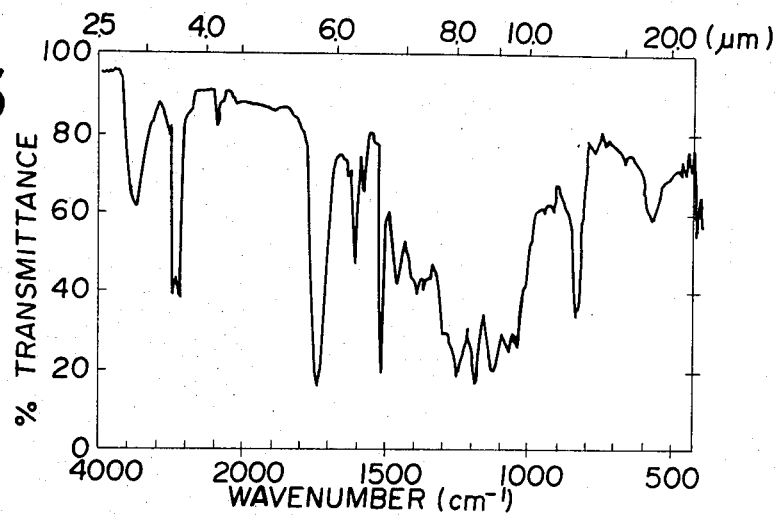

The infrared absorption spectrum of this reaction product is shown in FIG. 13.

EXAMPLE 35

The same reaction vessel as used in Example 34 was charged with 175 parts (1 equivalent weight) of novolak epoxy resin (a product of the following formula, wherein n ≈ 0.2, and epoxy equivalent 175, marketed under trademark designation of "Epikote 152"), 3 parts of dimethylaminoethyl methacrylate as a catalyst, and 0.6 part of hydroquinone monomethyl ether as a polymerization inhibitor.

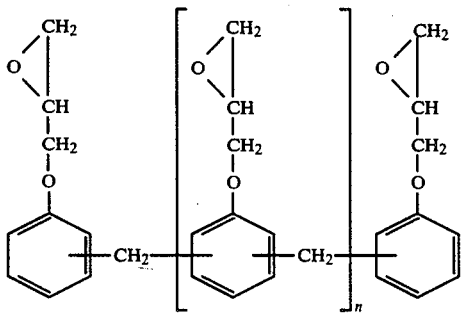

Then, to the content of the reaction vessel kept stirred at 100° C., 401 parts (1 equivalent weight) of the hydroxyl group-containing acrylate oligomer (1) obtained in Example 1 was added dropwise over a period of two hours. The resultant mixture was kept at the same temperature for five hours to continue the reaction. Consequently, there was obtained 580 parts of a reaction product of hydroxyl number 97.7 (hereinafter referred to as "hydroxyl group-containing acrylate prepolymer (2)"). This reaction product, on analysis by GPC, was found to contain no discernible unaltered novolak epoxy resin. On the basis of its hydroxyl number and its infrared absorption spectrum, this reaction product is identified as a hydroxyl group-containing acrylate prepolymer of the following structure.

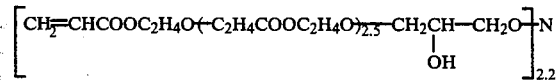

wherein N denotes a residue of novolak epoxy resin

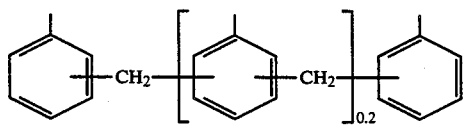

Figure 14:
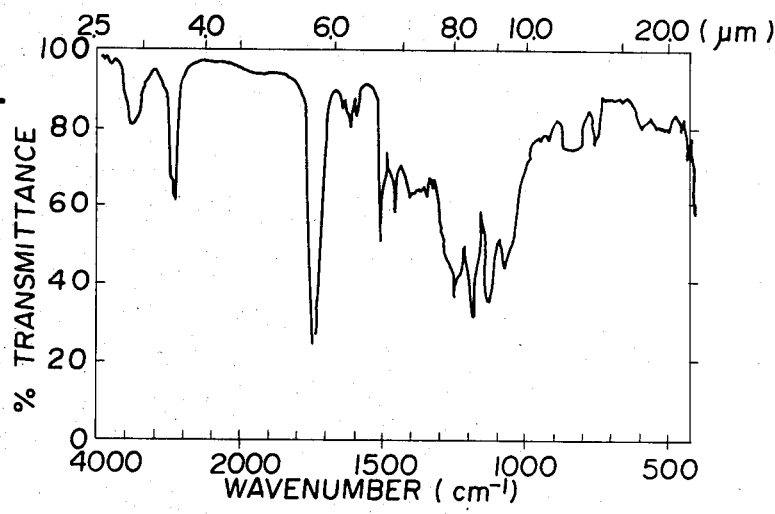

The infrared absorption spectrum of this reaction product is shown in FIG. 14.

EXAMPLE 36

The same reaction vessel as used in Example 34 was charged with 401 parts (1 equivalent weight) of the hydroxyl group-containing acrylate oligomer obtained in Example 1, 3 parts of dimethylaminoethyl methacrylate as a catalyst, and 0.5 part of hydroquinone monomethyl ether as a polymerization inhibitor. Then, to the content of the reaction vessel kept stirred at 95° C., 142 parts (1 equivalent weight) of glycidyl methacrylate was added dropwise over a period of 30 minutes. The resultant was kept at the same temperature for four hours to continue the reaction. Consequently, there was obtained 546 parts of a reaction product of hydroxyl number 102 (hereinafter referred to as "hydroxyl group-containing acrylate prepolymer (3)"). When this reaction product was analyzed by GPC, it was found to contain no discernible unaltered glycidyl methacrylate. On the basis of its hydroxyl number and its infrared absorption spectrum, this reaction product is identified as a hydroxyl group-containing acrylate prepolymer of the following structure.

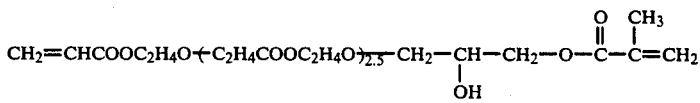

Figure 15:
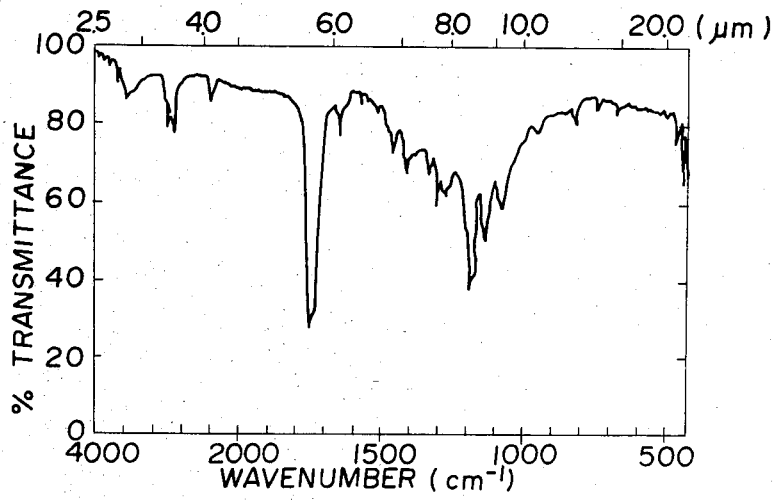

The infrared absorption spectrum of the reaction product is shown in FIG. 15.

EXAMPLE 37

The same reaction vessel as used in Example 34 was charged with 401 parts (1 equivalent weight) of the hydroxyl group-containing acrylate oligomer obtained in Example 1, 171 parts (1.5 equivalent weight) of ε-caprolactone, 6 parts of boron trifluoride etherate as a catalyst, and 1.3 parts of hydroquinone monomethyl ether as a polymerization inhibitor. The content of the reaction vessel was kept stirred at 70° C. for 10 hours for reaction. After completion of the reaction, the reaction mixture and 40 parts of magnesium silicate added thereto were stirred for one hours and then filtered under pressure. Consequently, there was obtained 533 parts of a reaction product of hydroxyl number 98 (hereinafter referred to as "hydroxyl group-containing acrylate prepolymer (4)"). When this reaction product was analyzed by GPC, it was found to contain 1.2% of unaltered ε-caprolactone.

On the basis of its hydroxyl number, the reaction product is identified as an acrylate prepolymer having an average of 1.5 mols of ε-caprolactone added through ring-opening polymerization to a hydroxyl acrylate oligomer.

EXAMPLE 38

The same reaction vessel as used in Example 34 was charged with 105 parts of tetraglycidyl ether type epoxy resin (a product of epoxy equivalent weight 210 and the following structure, marketed by Yuka Shell Epoxy Co., Ltd. under trademark designation of "Epikote 1031"), 2 parts of

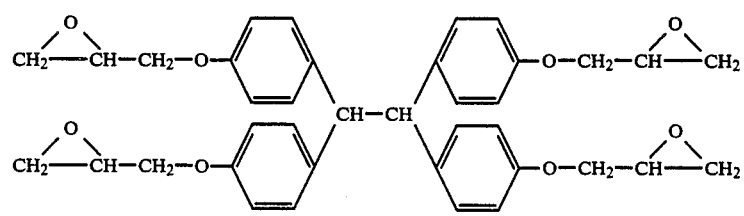

dimethyaminoethyl methacrylate as a catalyst, and 0.3 part of hydroquinone monomethyl ether as a polymerization inhibitor. Then, to the content of the reaction vessel kept stirred at 100° C., 201 parts of the hydroxyl group-containing acrylate oligomer (1) obtained in Example 1 was added dropwise over a period of 30 minutes. The resultant mixture and 110 parts of trimethylol propane triacrylate added thereto as a diluent were heated for reaction at 100° C. for three hours. Consequently, there was obtained 418 parts of a reaction product (hereinafter referred to as "hydroxyl group-containing acrylate prepolymer (5) solution ").

Figure 16:
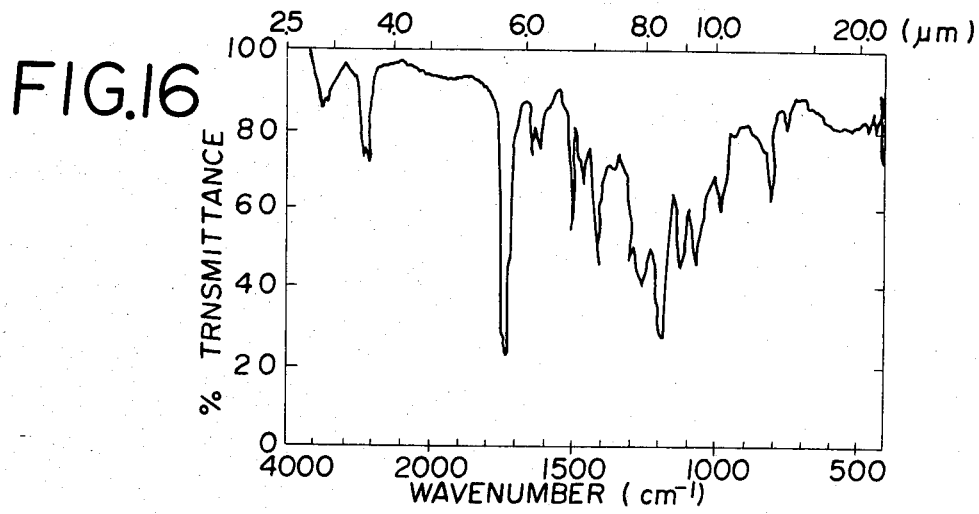

When this reaction product was analyzed by GPC, it was found to contain no discernible unaltered epoxy resin. The infrared absorption spectrum of this reaction product is shown in FIG. 16.

EXAMPLES 39–44

Hydroxyl group-containing (meth)acrylate prepolymers (6) through (11) were obtained by following the procedures indicated in Table 4 using the raw materials also indicated in Table 4.

EXAMPLES 45–50

Resin compositions (1) through (6) curable with ultraviolet light were prepared by adding 0.01 part of hydroquinone monomethyl ether and 5 parts of benzyldimethyl ketal (product of Ciba-Geigy and marketed under trademark designation of "Irgacure-651") to 100 parts of each of the mixtures consisting of the hydroxyl group-containing (meth)acrylate oligomers (1), (3), and (12) obtained in Examples 1, 3, and 12, prepolymers indicated in Table 5 and/or reactive diluents. The resin compositions (1) through (6) so prepared were independently applied in a thickness of 15 μm on steel panels. With the aid of an apparatus comprising a conveyor and a medium pressure mercury lamp of 80 W/cm disposed at a distance of 10 cm above the conveyor, the layers of the compositions on the panels were irradiated with the light from the mercury lamp by moving the panels at a conveyor speed of 6 m/min. After just one cycle of the irradiation, the layers produced tack-free cured films. The properties of the cured films are shown in Table 5.

Control 2

A comparative resin composition (1) curable with ultraviolet light was prepared by adding 0.01 part of hydroquinone monomethyl ether and 5 parts of benzyldimethyl ketal (a product of Ciba-Geigy, marketed under trademark designation of "Irgacure-651") to 100 parts of a mixture of a prepolymer with a reactive diluent indicated in Table 5. The comparative resin composition (1) was tested for the curing property of a layer of the composition applied on a steel panel by following the procedure of Example 45. Two cycles of the irradiation conducted by the same apparatus were necessary for the applied layer to produce a tack-free cured film. The properties of the cured film are shown in Table 5.

EXAMPLE 51

A resin composition (7) curable with ultraviolet light was prepared by adding 5 parts of benzyldimethyl ketal (a product of Ciba-Geigy, marketed under trademark designation of "Irgacure-651") to 100 parts of the hydroxyl group-containing (meth)acrylate oligomer (1) obtained in Example 1. The resin composition (7) so prepared was applied in a thickness of 15 μm on a steel panel. With the aid of an apparatus comprising a conveyor and a medium pressure mercury lamp of 80 W/cm disposed at a distance of 10 cm above the conveyor, the layer of the resin composition on the panel was irradiated with the light from the mercury lamp by moving the panel at a conveyor speed of 6 m/min. After just one cycle of the irradiation, the layer produced a cured film. The cured film was tested for its properties by following the procedure of Example 45 and found to have pencil hardness of 2B and adhesion of 100/100.

EXAMPLES 52–62

Photo-curing compositions (8) through (18) were prepared by adding 0.01 part of hydroquinone monomethyl ether and 5 parts of benzyldimethyl ketal (a product of Ciba-Geigy, marketed under trademark designation of "Irgacure-651") each to 100 parts each of varying mixtures of the urethane (meth)acrylate prepolymers (1) through (11) with ethylenically unsaturated compounds indicated in Table 6. These compositions were applied in a thickness of 15 μm on steel panels. With the aid of an apparatus comprising a conveyor and a medium pressure mercury lamp of 80 W/cm disposed at a distance of 10 cm above the conveyor, the layers of the compositions on the panels were irradiated with the light from the mercury lamp by moving the panels at a conveyor speed of 6 m/min. The layer of the composition (16) alone required three cycles of the irradiation to produce a cured film. After just one cycle of the irradiation, the layers of the other compositions produced tack-free cured films. The properties of the cured films so produced are shown in Table 6.

EXAMPLE 63

A resin composition (19) curable with ultraviolet light was prepared by adding 3 parts of benzoin isopropyl ether to 100 parts of the urethane acrylate prepolymer (3) obtained in Example 17. The resin composition (19) so obtained was applied in a thickness of 15 μm on a steel panel. With the aid of an apparatus comprising a conveyor and a medium pressure mercury lamp of 80 W/cm disposed at a distance of 10 cm above the conveyor, the layer of the resin composition on the panel was irradiated with the light from the mercury lamp by moving the panel at a conveyor speed of 3 m/min. After just one cycle of the irradiation, the layer produced a tack-free cured film. The cured film was tested for its properties by following the procedure of Example 52 and found to have pencil hardness of 7H and adhesion of 100/100.

EXAMPLES 64–71

Compositions (20) through (27) curable with light were prepared by adding 0.01 part of hydroquinone monomethyl ether and 5 parts of benzyldimethyl ketal (a product of Ciba-Geigy, marketed under trademark designation of "Irgacure-651") to 100 parts each of the carboxyl group-containing (meth)acrylate prepolymers or varying mixtures of carboxyl group-containing (meth)acrylate prepolymers with ethylenically unsaturated compounds indicated in Table 7. The compositions were applied in a thickness of 15 μm on steel panels. With the aid of an apparatus comprising a conveyor and a medium pressure mercury lamp of 80 W/cm disposed at a distance of 10 cm above the conveyor, the layers of the compositions on the panels were irradiated with the light from the mercury lamp by moving the panels at a conveyor speed of 6 m/min. After just one cycle of the irradiation, the layers produced tack-free cured films. The properties of the cured films so produced are shown in Table 7.

EXAMPLES 72–82

Compositions (28) through (38) curable with light were prepared by adding 0.01 part of hydroquinone monomethyl ether and 5 parts of benzyldimethyl ketal (a product of Ciba-Geigy, marketed under trademark designation of "Irgacure-651") each to 100 parts each of the hydroxyl group-containing (meth)acrylate prepolymers (1) through (11) obtained in Examples 34 through 44 or mixtures thereof with ethylenically unsaturated compounds indicated in Table 8. The compositions were applied in a thickness of 15 μm on steel panels. With the aid of an apparatus comprising a conveyor and a medium pressure mercury lamp of 80 W/cm disposed at a distance of 10 cm above the conveyor, the layers of the compositions on the panels were irradiated with the light from the mercury lamp by moving the panels at a conveyor speed of 6 m/min. The layers of compositions (30), (36), and (37) required three cycles of the irradiation to produce cured films. After just one cycle of the irradiation, the layers of the other compositions produced tack-free cured films. The properties of the cured films are shown in Table 8.

EXAMPLE 83

In a reaction vessel provided with a stirrer, a thermometer, a reflux condenser, and a nitrogen gas inlet, 20 parts of xylene and 20 parts of isobutyl acetate joined and swept with a flow of nitrogen gas were heated to 100° C. To the resultant solution which had reached 100° C., a mixture containing 5 parts of the hydroxyl group-containing acrylate oligomer (1) obtained in Example 1, 7 parts of hydroxyethyl methacrylate, 0.5 part of acrylic acid, 20 parts of methyl methacrylate, 8.5 parts of butyl methacrylate, 7 parts of butyl acrylate, 12 parts of styrene, and 0.5 part of azobisisobutyronitrile was added dropwise over a period of four hours. The resultant mixture was kept at the same temperature for four hours, to afford a copolymer solution having nonvolatile content of 60% and viscosity of $Z-Z_2$.

Figure 17:
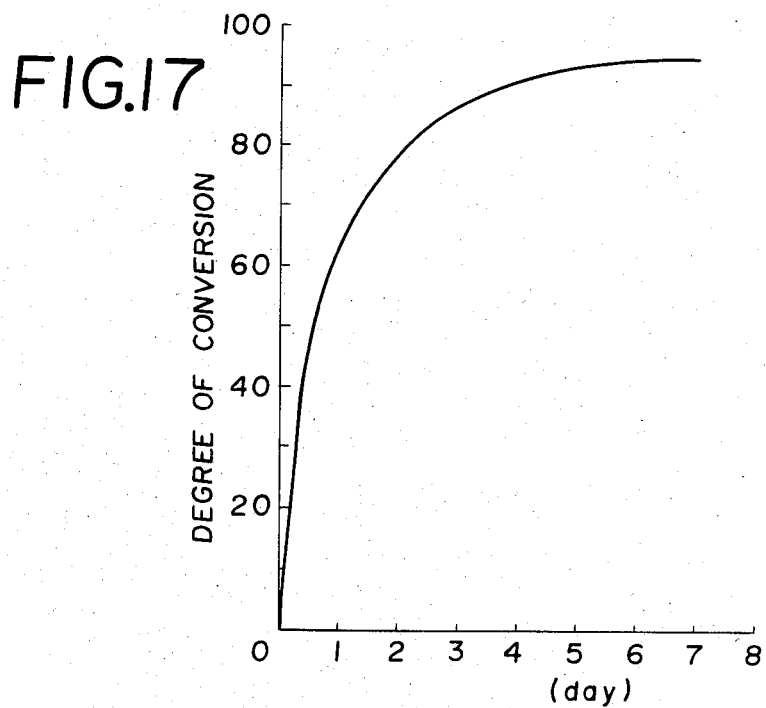
FIG. 17 is a graph showing a time-course change of reactivity at 20° C. and 60% RH of a composition containing a hydroxyl group-containing (meth)acrylate oligomer according with this invention.

The copolymer solution so obtained and hexamethylene diisocyanate were mixed in amounts to give an OH/NCO ratio of 1/1. The composition so prepared was applied in a thickness of 75 μm on a steel panel and the layer of composition was subjected to forced drying at 60° C., for 40 minutes. The film consequently obtained was found to have pencil hardness of F (as determined by the pencil scratch test defined in Paragraph 6.14 JIS K5400-1979) and adhesion of 100/100 (as determined by the cross cut test defined in Paragraph 6.15, JIS K 5400-1979) and satisfactory waterproofness (as determined by the waterproof test defined in Paragraph 7.2, JIS K5400-1979). It also exhibited satisfactory curing property, initial curing property, and inner curing property. The curing property of the composition as determined in terms of change of reactivity by aging at 20° C. and 60% RH is shown in FIG. 17.

EXAMPLE 84

An adhesive composition was prepared by adding 20 parts of trimethylol propane trimethacrylate and 2 parts of azobisisobutyronitrile to 80 parts of the urethane acrylate prepolymer (2) obtained in Example 16. The adhesive composition obtained as described above was applied in an area of 20 mm × 20 mm on the edge surface of one of two steel sheets 1.6 mm in thickness, 20 mm in width, and 100 mm in length. The other steel sheet was attached fast to the first steel sheet in a stepped manner. The joined steel sheets were kept at 80° C. for three hours to obtain a test piece for measurement of adhesive strength. When this test piece was set in an Instron material tester, type 1102, and drawn in the opposite directions from the joined part at a speed of 5 mm/min, it was found to possess adhesive strength of 70 kg/cm².

EXAMPLE 85

When 3 parts of methylethyl ketone peroxide and 1 part of cobalt naphthenate were added to 100 parts of the urethane acrylate prepolymer (1) obtained in Example 15 and the resultant mixture was left standing, the mixture gradually solidified and produced a tough cured resin having pencil hardness of 5H after 24 hours' standing.

EXAMPLE 86

When 3 parts of methylethyl ketone peroxide and 1 part of cobalt naphthenate were added to 100 parts of the carboxyl group-containing acrylate prepolymer (1) obtained in Example 26 and the resultant mixture was left standing, the mixture gradually solidified and produced a tough cured resin having pencil hardness of 2H after 24 hours' standing.

EXAMPLE 87

When 3 parts of methylethyl ketone peroxide and 1 part of cobalt naphthenate were added to 100 parts of the hydroxyl group-containing acrylate prepolymer (1) obtained in Example 34 and the resultant mixture was left standing, the mixture gradually solidified and produced a tough cured resin having pencil hardness of 5H after 24 hours' standing.

The acronyms found in the following tables stand for the following substances.

| | |
|---|---|
| HQ: | Hydroquinone |
| MEHQ: | Hydroquinone monomethyl ether |
| STA: | Tungstosilicic acid |
| STA-Na: | 12-tungstosilicic acid 1-sodium salt |
| PMA: | Molybdophosphoric acid |
| $BF_3$: | Boron trifluoride etherate |
| $SnCl_4$: | Tin tetrachloride |
| PTS: | Paratoluene-sulfonic acid |
| $H_2SO_4$: | Sulfuric acid |
| TOS: | Titanium oxysulfate |
| HEMA: | 2-Hydroxyethyl methacrylate |
| PETA: | Pentaerythritol triacrylate |
| IPDI: | Isophorone diisocyanate |
| MDI: | Diphenyl methane-4,4'-diisocyanate |
| TDI: | 2,6-Tolylene diisocyanate |
| XDI: | Metaxylylene diisocyanate |
| SA: | Succinic anhydride |
| PA: | Phthalic anhydride |
| TPA: | Tetrahydrophthalic anhydride |
| PMA: | Pyromellitic anhydride |
| BO: | α-Butylene oxide |
| AGE: | Allyl glycidyl ether |
| BADG: | Bis-phenol A type epoxy resin (a product of epoxy equivalent weight 190, marketed by Yuka Shell Epoxy Co., Ltd. under trademark designation of "Epikote 828") |
| PEA: | Polyester acrylate synthesized by causing 2 mols of acrylic acid to react upon polyester polyol obtained by the reaction of 1 mol of phthalic anhydride with 2 mols of 1,6-hexane diol. |
| UA: | Urethane acrylate synthesized by the reaction of 1 mol of tolylene diisocyanate with 2 mols of hydroxyethyl acrylate. |
| EPA: | Epoxy acrylate synthesized by the |

|       |                                                                 |
|-------|-----------------------------------------------------------------|
|       | reaction of 1 mol of bis-phenol A type diglycidyl ether with 2 mols of acrylic acid. |
| UA2:  | Urethane acrylate synthesized by the reaction of 2 mols of isophorone diisocyanate with 1 mol of triethylene glycol and 2 mols of hydroxyethyl acrylate. |
| TMPTA: | Trimethylol propane triacrylate |
| HDDA: | 1,6-Hexane diol diacrylate |
| BA3EA: | Diacrylate of adduct of 3 mols of ethylene oxide to bis-phenol A |
| MAEP: | Monoacryloyl oxyethyl ester of phthalic acid |
| HEA:  | 2-Hydroxyethyl acrylate |
| PHEA: | Phenoxyethyl acrylate |
| DPHA: | Dipentaerythritol hexaacrylate |
| NVP:  | N—vinyl pyrrolidone |
| PETEA: | Pentaerythritol tetraacrylate |
| TAEP: | Triacryloxyethyl phosphate |
| TITA: | Tris-(2-hydroxyethyl)-isocyanurate triacrylate |

The measurement of pencil hardness was made in accordance with the method defined by JIS K5400. The measurement of adhesion was made by the following method: On a sample film a checker-board pattern consisting of 100 squares of 1 mm was inscribed by inserting perpendicularly intersecting straight lines at intervals of 1 mm. A cellophane adhesive tape was applied fast on the pattern and then ripped off the film. Then, the pattern was visually examined to find the number of squares separated from the pattern. The adhesion was reported in the ratio of [100−(number of separated squares)]/100.

TABLE 1

| | Example | 4 | 5 | 6 | 7 | 8 | 9 | 10 | 11 |
|---|---|---|---|---|---|---|---|---|---|
| Raw materials | 2-Hydroxyethyl acrylate (part) | 232 | 232 | 232 | 232 | 232 | 232 | 232 | 232 |
| | Polymerization inhibitor (part) | MEHQ 0.07 | MEHQ 0.07 | MEHQ 0.07 | HQ 0.07 | HQ 0.12 | HQ 0.12 | MEHQ 0.12 | MEHQ 0.12 |
| | Catalyst (part) | STA 4.6 | STA—Na 2.3 | PMA 1.2 | $BF_3$ 1.2 | $SnCl_4$ 2.3 | PTS 1.2 | $H_2SO_4$ 2.3 | TOS 2.3 |
| Reaction conditions | Reaction temperature (°C.) | 80 | 80 | 80 | 90 | 90 | 90 | 80 | 80 |
| | Reaction time (Hr) | 10 | 6 | 6 | 6 | 6 | 8 | 6 | 6 |
| Reaction product (part) | | 227 | 228 | 226 | 227 | 227 | 228 | 227 | 225 |
| Yield (%) | | 97.8 | 98.3 | 97.4 | 97.8 | 98.3 | 97.8 | 96.7 | |
| Attributes of reaction product | Color Hue (APHA) | 10 | 10 | 20 | 50 | 40 | 40 | 20 | 20 |
| | Average molecular weight | 1098 | 432 | 385 | 334 | 370 | 326 | 469 | 383 |
| | Average addition mol* (p) | 8.5 | 2.7 | 2.3 | 1.9 | 2.2 | 1.8 | 3.0 | 2.3 |

*Number denoted by the symbol "p" in the following structural formula.
$CH_2 = CHCOOCH_2CH_2O \text{\textlparen} CH_2CH_2COOCH_2CH_2O \text{\textrparen}_p H$

TABLE 2

| | | Raw materials (equivalent weight) | | | | | | | | | |
|---|---|---|---|---|---|---|---|---|---|---|---|
| | Urethane (meth)acrylate | Hydroxyl group-containing (meth)acrylate oligomer* | | | | Hydroxyl group-containing organic compound | | Isocyanate group-containing organic compound | | | Free isocyanate group content of reaction product |
| Example | prepolymer | (1) | (3) | (4) | (12) | HEMA | PETA | IPDI | MDI | TDI | XDI | (%) |
| 19 | (5) | 0.5 | | | | | | 0.5 | | | | Max. 0.1 |
| 20 | (6) | | 0.5 | | | | | | 0.5 | | | Max. 0.1 |
| 21 | (7) | | 0.5 | | | | | | | 0.25 | 0.25 | Max. 0.1 |
| 22 | (8) | | | 0.5 | | | | | | 0.5 | | Max. 0.1 |
| 23 | (9) | | | | 0.5 | | | | | 0.5 | | Max. 0.1 |
| 24 | (10) | 0.25 | | | | 0.25 | | | | | 0.5 | Max. 0.1 |
| 25 | (11) | 0.25 | | | | | 0.25 | | | 0.5 | | Max. 0.1 |

*(1): Hydroxyl group-containing acrylate oligomer (1) obtained in Example 1
(3): Hydroxyl group-containing acrylate oligomer (3) obtained in Example 3
(4): Hydroxyl group-containing acrylate oligomer (4) obtained in Example 4
(12): Hydroxyl group-containing methacrylate oligomer (12) obtained in Example 12.

TABLE 3

| | | Raw materials (parts) | | | | | | | | |
|---|---|---|---|---|---|---|---|---|---|---|
| | Carboxyl group-containing (meth)acrylate | Hydroxyl group-containing (meth)acrylate oligomer (A)* | | | Hydroxyl group-containing organic compound (C) | Compound (B) | | | | Acid number of reaction |
| Example | prepolymer | (1) | (3) | (12) | HEMA | SA | PA | TPA | PMA | product |
| 28 | (3) | 401 | | | | | 148 | | | 97 |
| 29 | (4) | | 510 | | | 100 | | | | 88 |
| 30 | (5) | | 510 | | | | | 152 | | 82 |
| 31 | (6) | | | 297 | | | 148 | | | 123 |
| 32 | (7) | 201 | | | 65 | | | | 109 | 146 |

*(1): Hydroxyl group-containing acrylate oligomer (1) obtained in Example 1.
(3): Hydroxyl group-containing acrylate oligomer (3) obtained in Example 3.
(12): Hydroxyl group-containing methacrylate oligomer (12) obtained in Example 12.

TABLE 4

| | Raw materials (equivalent weight) | | | | | | | | | |
|---|---|---|---|---|---|---|---|---|---|---|
| | Hydroxyl group-containing (meth)-acrylate prepolymer | Hydroxyl group-containing compound | | | | | | | Carboxylic group-containing compound acrylic acid | |
| | | Hydroxyl group-containing (meth)acrylate oligomer | | | | Oxygen-containing cyclic compound | | | | Hydroxyl number of reaction product (mg KOH/g) |
| Example | | (1) | (3) | (12) | HEMA | BO | AGE | BADG | | Procedure used |
| 39 | (6) | 1 | | | 1 | | | | | Similar procedure to Example 36 | 113 |
| 40 | (7) | 1 | | | | | 1 | | | Similar procedure to Example 36 | 106 |
| 41 | (8) | | 1 | | | | | 1 | | Similar procedure to Example 34 | 79.4 |
| 42 | (9) | | | 1 | | | | 1 | | Similar procedure to Example 34 | 113 |
| 43 | (10) | 0.6 | | | 0.4 | | | 1 | | Similar procedure to Example 34 | 114 |
| 44 | (11) | 0.8 | | | | | | 1 | 0.2 | Similar procedure to Example 34 | 105 |

*(1): Hydroxyl group-containing acrylate oligomer (1) obtained in Example 1.
(3): Hydroxyl group-containing acrylate oligomer (3) obtained in Example 3.
(12): Hydroxyl group-containing methacrylate oligomer (12) obtained in Example 12.

TABLE 5

| Example | Resin composition curable with ultraviolet light | Composition of mixture | | | | | | Pencil hardness | Adhesion |
|---|---|---|---|---|---|---|---|---|---|
| | | Hydroxyl group-containing (meth)acrylate oligomer | Amount used (part) | Prepolymer | Amount used (part) | Reactive diluent | Amount used (part) | | |
| Example 45 | Resin composition (1) of this invention | (1) | 30 | PEA | 60 | TMPTA | 10 | 2H | 100/100 |
| Example 46 | Resin composition (2) of this invention | (1) | 25 | UA | 60 | HDDA | 15 | 2H | 100/100 |
| Example 47 | Resin composition (3) of this invention | (1) | 30 | EPA | 40 | TMPTA | 30 | 3H | 100/100 |
| Example 48 | Resin composition (4) of this invention | (3) | 80 | — | — | BA3EA | 20 | H | 100/100 |
| Example 49 | Resin composition (5) of this invention | (1) | 20 | EPA | 50 | MAEP | 20 | 2H | 100/100 |
| | | | | | | HDDA | 10 | | |
| Example 50 | Resin composition (6) of this invention | (1) | 20 | UA2 | 60 | TMPTA | 10 | H | 100/100 |
| | | (12) | 10 | | | | | | |
| Control 2 | Comparative resin composition (1) | — | — | PEA | 60 | HEA | 30 | H | 75/100 |
| | | | | | | TMPTA | 10 | | |

TABLE 6

| Example | Composition | Composition of mixture | | | | Pencil hardness | Adhesion |
|---|---|---|---|---|---|---|---|
| | | Urethane (meth)acrylate prepolymer | Amount used (part) | Ethylenically unsaturated compound | Amount used (part) | | |
| 52 | (8) | (1) | 60 | TMPTA | 40 | 7H | 100/100 |
| 53 | (9) | (2) | 50 | TMPTA | 40 | 7H | 100/100 |
| | | | | PHEA | 10 | | |
| 54 | (10) | (3) | 60 | HDDA | 10 | 6H | 100/100 |
| | | | | DPHA | 30 | | |
| 55 | (11) | (4) | 50 | TMPTA | 50 | 7H | 100/100 |
| 56 | (12) | (5) | 50 | DPHA | 50 | 8H | 100/100 |
| 57 | (13) | (6) | 50 | NVP | 10 | 7H | 100/100 |
| | | | | PETEA | 40 | | |
| 58 | (14) | (7) | 30 | DPHA | 60 | 8H | 100/100 |
| | | | | TAEP | 10 | | |
| 59 | (15) | (8) | 40 | DPHA | 50 | 7H | 100/100 |
| | | | | TMPTA | 10 | | |
| 60 | (16) | (9) | 40 | DPHA | 50 | 7H | 100/100 |
| | | | | TMPTA | 10 | | |
| 61 | (17) | (10) | 60 | TMPTA | 20 | 6H | 100/100 |
| | | | | TITA | 20 | | |
| 62 | (18) | (11) | 20 | DPHA | 40 | 6H | 100/100 |
| | | | | PETEA | 30 | | |

TABLE 6-continued

| | | Composition of mixture | | | |
|---|---|---|---|---|---|
| | | Urethane (meth)acrylate prepolymer | Ethylenically unsaturated compound | | |
| Example | Composition | Amount used (part) | Amount used (part) | Pencil hardness | Adhesion |
| | | | NVP 10 | | |

TABLE 7

| | | Composition of mixture | | | |
|---|---|---|---|---|---|
| | | Carboxyl group-containing (meth)acrylate prepolymer | Ethylenically unsaturated compound | | |
| Example | Composition | Amount used (part) | Amount used (part) | Pencil hardness | Adhesion |
| 64 | (20) | (1) 100 | — — | 2H | 100/100 |
| 65 | (21) | (2) 100 | — — | 2H | 100/100 |
| 66 | (22) | (3) 50 | TMPTA 50 | 3H | 100/100 |
| 67 | (23) | (4) 60 | DPHA 40 | 3H | 100/100 |
| 68 | (24) | (5) 30 | TMPTA 40 | 4H | 100/100 |
| | | | UA 30 | | |
| 69 | (25) | (6) 30 | TMPTA 60 | 3H | 100/100 |
| | | | DPHA 10 | | |
| 70 | (26) | (7) 30 | TMPTA 40 | 4H | 100/100 |
| | | | EPA 30 | | |
| 71 | (27) | (8) 60 | TMPTA 40 | 3H | 100/100 |

TABLE 8

| | | Composition of mixture | | | |
|---|---|---|---|---|---|
| | | Hydroxyl group-containing (meth)acrylate prepolmyer | Ethylenically unsaturated compound | | |
| Example | Composition | Amount used (part) | Amount used (part) | Pencil hardness | Adhesion |
| 72 | (28) | (1) 50 | TMPTA 50 | 3H | 100/100 |
| 73 | (29) | (2) 50 | HDDA 50 | 4H | 100/100 |
| 74 | (30) | (3) 100 | — — | 2H | 100/100 |
| 75 | (31) | (4) 60 | DPHA 40 | 4H | 100/100 |
| 76 | (32) | (5) 80 | HDDA 20 | 3H | 100/100 |
| 77 | (33) | (6) 30 | UA 70 | 4H | 100/100 |
| 78 | (34) | (7) 30 | TMPTA 60 | 3H | 100/100 |
| | | | DPHA 10 | | |
| 79 | (35) | (8) 40 | TMPTA 40 | 3H | 100/100 |
| | | | HDDA 20 | | |
| 80 | (36) | (9) 40 | TMPTA 60 | 3H | 100/100 |
| 81 | (37) | (10) 50 | HDDA 50 | 3H | 100/100 |
| 82 | (38) | (11) 40 | TMPTA 50 | 3H | 100/100 |
| | | | DPHA 10 | | |

What is claimed is:

1. A hydroxyl group-containing (meth)acrylate oligomer represented by the general formula I:

$$CH_2=\overset{R^1}{\underset{|}{C}}-\overset{O}{\underset{\|}{C}}-O-Z-O(CH_2-CH-\overset{O}{\underset{\|}{C}}-O-Z-O)_p H \quad (I)$$

wherein two $R^1$'s independently stand for hydrogen atom or methyl group, two Z's independently stand for a divalent hydrocarbon group of 2 to 20 carbon atoms, and p stands for an integer of the value of 1 to 100.

2. A hydroxyl group-containing (meth)acrylate oligomer according to claim 1, wherein the symbol Z in the general formula stands for a divalent hydrocarbon group of 2 to 6 carbon atoms.

3. A hydroxyl group-containing (meth)acrylate oligomer according to claim 1, wherein the symbol p in the general formula stands for an integer of the value of 1 to 20.

4. A method for the production of a hydroxyl group-containing (meth)acrylate oligomer represented by the general formula I:

$$CH_2=\overset{R^1}{\underset{|}{C}}-\overset{O}{\underset{\|}{C}}-O-Z-O(CH_2-CH-\overset{O}{\underset{\|}{C}}-O-Z-O)_p H \quad (I)$$

wherein two $R^1$'s independently stand for hydrogen atom or methyl group two Z's independently stand for a divalent hydrocarbon group of 2 to 20 carbon atoms, and p stands for an integer of the value of 1 to 100, which method comprises addition polymerizing a hydroxyl group-containing (meth)acrylate represented by the general formula IV:

$$CH_2=\overset{R^1}{\underset{|}{C}}-\overset{O}{\underset{\|}{C}}-O-Z-OH \quad (IV)$$

wherein $R^1$ stands for hydrogen atom or methyl group and Z stands for a divalent hydrocarbon group of 2 to 20 carbon atoms, in the presence of a catalyst thereby converting said hydroxyl group-containing (meth)acrylate into an oligomer.

5. A method according to claim 4, wherein said catalyst is at least one member selected from the group consisting of protonic acid, Lewis acids, oxy sulfates, heteropoly acids and salts thereof, and isopoly acids.

6. A method according to claim 5, wherein said catalyst is a heteropoly acid.

7. A method according to claim 4, wherein said reaction is carried out at a temperature in the range of 10° to 150° C.

8. A method according to claim 4, wherein the symbol Z in the general formula stands for a divalent organic group of 2 to 6 carbon atoms.

9. A method according to claim 4, wherein the symbol p in the general formula stands for an integer of the value of 1 to 20.

10. A method according to claim 4, wherein said hydroxyl group-containing (meth)acrylate represented by the general formula IV is a hydroxyalkyl (meth)acrylate.

11. A hydroxyl group-containing (meth)acrylate prepolymer, comprising the reaction product of a hydroxyl group-containing compound (E) containing as an essential component thereof a hydroxyl group-containing (meth)acrylate oligomer (A) represented by the general formula I:

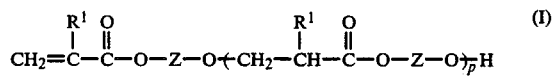

wherein two $R^1$'s independently stand for hydrogen atom or methyl group, two Z's independently stand for a divalent organic group of 2 to 20 carbon atoms, and p stands for an integer of the value of 1 to 100, with an oxygen-containing cyclic compound (F) and optionally further with a carboxylic group containing compound (G).

12. A hydroxyl group-containing (meth)acrylate prepolymer according to claim 11, wherein said oxygen-containing cyclic compound is a lactone.

13. A curable composition containing as an essintial component thereof a hydroxyl group-containing (meth)acrylate oligomer according to claim 1.

14. A composition according to claim 13, which further contains an ethylenically unsaturated compound.

15. A curable composition containing as an essential component thereof a hydroxyl group-containing (meth)acrylate prepolymer according to claim 11.

16. A composition according to claim 15, which further contains an ethylenically unsaturated compound.

17. A curable composition, comprising at least one of the curable compositions according to claim 13 and a photo initiator.

18. A curable composition, comprising at least one of the curable compositions according to claim 13 and a radical polymerization initiator.

19. A coating composition preponderantly comprising a curable composition according to claim 17.

20. A coating composition preponderantly comprising a curable composition according to claim 18.

21. An adhesive composition preponderantly comprising a curable composition according to claim 17.

22. An adhesive composition preponderantly comprising a curable composition according to claim 18.

* * * * *